US009258432B2

(12) United States Patent
Lauer

(10) Patent No.: US 9,258,432 B2
(45) Date of Patent: Feb. 9, 2016

(54) DYNAMIC TIME BASED PRODUCTS

(71) Applicant: GOGO LLC, Itasca, IL (US)

(72) Inventor: Bryan Adrian Lauer, Hinckley, IL (US)

(73) Assignee: GOGO LLC, Chicago, IL (US)

( * ) Notice: Subject to any disclaimer, the term of this patent is extended or adjusted under 35 U.S.C. 154(b) by 53 days.

(21) Appl. No.: 14/291,562

(22) Filed: May 30, 2014

(65) Prior Publication Data

US 2015/0350457 A1 Dec. 3, 2015

(51) Int. Cl.
*H04M 15/00* (2006.01)
*G06Q 50/14* (2012.01)
*H04W 4/24* (2009.01)
*H04L 29/08* (2006.01)
*H04W 24/08* (2009.01)

(52) U.S. Cl.
CPC ............. *H04M 15/735* (2013.01); *G06Q 50/14* (2013.01); *H04L 67/12* (2013.01); *H04M 15/8016* (2013.01); *H04W 4/24* (2013.01); *H04W 24/08* (2013.01)

(58) Field of Classification Search
CPC .......... H04M 15/735; H04M 15/8016; H04W 24/08; H04W 4/24; G06Q 50/14; H04L 67/12
See application file for complete search history.

(56) References Cited

U.S. PATENT DOCUMENTS

2013/0006931 A1* 1/2013 Nelke et al. ....... G06F 17/30303
707/625
2014/0068348 A1* 3/2014 Mondal .................. H04L 41/16
714/45

* cited by examiner

*Primary Examiner* — Marcos Torres
(74) *Attorney, Agent, or Firm* — Marshall, Gerstein & Borun LLP; Randall G. Rueth

(57) ABSTRACT

The system and method alters the data delivery service plan of a subscriber in response to a network degradation event that negatively affects the subscriber's plan during transportation (e.g. in flight). In response to the subscriber's request, the system and method grants the subscriber access to the in-flight network and/or data during the flight. Additionally, the system and method monitors and detects network degradation events during the flight. If an event occurs that negatively affects the subscribers plan during the flight, the system and method determines a time extension for the subscriber to access the network and/or data based on the duration of the network degradation event. The system and method also modifies the subscriber's plan based on the determined time extension and notifies the subscriber about the network degradation event and plan modification. The plan modification may credit the subscriber additional time, data, and/or services.

17 Claims, 9 Drawing Sheets

DYNAMIC TIME BASED PRODUCTS

FIELD OF THE DISCLOSURE

The present disclosure generally relates to a system and method for providing network and/or data access to subscribers that are passengers on a vehicle while in transit, such as airplane passengers during their flight.

BACKGROUND

Passengers on commercial transit vehicles are often frustrated with their customer experience during transit. Customer frustration is especially prevalent in the airline industry. As a result, some organizations may attempt to improve the customer transportation experience by provide data delivery services, such as Wi-Fi or other data delivery services, to devices on-board a vehicle during transit. The on-board device may be, for example, a passenger's mobile computing device (e.g. mobile phone, smart phone, tablet, PDA, laptop). To establish communications for services to onboard devices, providers often use a wireless communication link over which communications or data is delivered to and from the vehicle. In the airline industry, the wireless communication link is often a direct Air-to-Ground (ATG) link or a satellite link to communicate data to and from a plane.

However, data delivery services to onboard devices may be interrupted due to communication system problems. For example, if the vehicle travels through an area with poor coverage for the communication link, the vehicle network may perform poorly. As a result, customers may be dissatisfied with interrupted data delivery services resulting from network performance degradation. Thus, providing data delivery services to enhance customer satisfaction during transportation is a challenge for organizations.

SUMMARY

A computer system for providing a dynamic, time-based data delivery service to airline passenger subscribers while in flight including a ground based communication system including a ground based communication system processor, and a ground based communication system program memory storing executable instructions that when executed by the ground based communication system processor cause the computer system to receive a request from a potential subscriber to receive an in-flight data delivery service plan to access data via an in-flight network for a predetermined initial time; verify the request from the potential subscriber; grant the subscriber the data delivery service plan to access data via the in-flight network for the predetermined initial time; detect a network degradation event that lasts for a delay time, wherein the network degradation event occurs during a flight when the in-flight network has a decreased network connectivity and/or response speed that exceeds a degradation threshold; categorize the network degradation event as a time delay event; determine, in response to the time delay event, a modification for the data delivery service plan for the subscriber to access data via in-flight networks; notify the subscriber about the network degradation event; modify the data delivery service plan for the subscriber to include the modification; and notify the subscriber of the modification to the data delivery service plan.

In an embodiment, a method for providing a dynamic, time-based data delivery service to airline passenger subscribers while in flight including receiving, by one or more computing devices, a request from a potential subscriber to receive an in-flight data delivery service plan to access data via an in-flight network for a predetermined initial time; verifying, by the computing devices, the request from the potential subscriber; granting, by the computing devices, the subscriber the data delivery service plan to access data via the in-flight network for the predetermined initial time; detecting, by the computing devices, a network degradation event that lasts for a delay time, wherein the network degradation event occurs during a flight when the in-flight network has a decreased network connectivity and/or response speed that exceeds a degradation threshold; categorizing, by the computing devices, the network degradation event as a time delay event; determining, by the computing devices, in response to the time delay event, a time extension for the data delivery service plan for the subscriber to access data via the in-flight network, wherein the time extension is determined based on at least the delay time or the predetermined initial time; notifying the subscriber about the network degradation event; modifying, by the computing devices, the data delivery service plan for the subscriber based on the time extension; and notifying, by the computing devices, the subscriber of the modification to the data delivery service plan.

In another embodiment, a computer system for providing a dynamic, time-based data delivery service to airline passenger subscribers while in flight including a processor, and a program memory storing executable instructions that when executed by the processor cause the computer system to receive a request from a possible subscriber to access data via an in-flight network during a flight on a plane; verify the possible subscriber is a subscriber authorized to access data via the in-flight network during the flight; grant the request of the authorized subscriber to access data via the in-flight network during the flight; detect a network degradation event that lasts for a delay time during the flight, wherein the network degradation event occurs when the in-flight network has a decreased network connectivity and/or response speed that exceeds a degradation threshold; categorize the network degradation event as a time delay event when the delay time exceeds a time delay event threshold; receive a data request from the subscriber; determine the data request cannot be accommodated during the time delay event; and respond to the subscriber data request by providing the subscriber a network degradation event notification during the time delay event.

In another embodiment, a method for providing a dynamic, time-based data delivery service to airplane passenger subscribers while in flight including determining a subscriber with a data delivery service plan for in-flight network access for an initial time is engaged in an activity at the time, or shortly before the time, when the predetermined initial time runs out, wherein the initial time is the initial amount of time a subscriber receives for in-flight network access; automatically extending the initial time by a time extension when the subscriber is engaged in an activity while the initial time runs out; sending the subscriber a message after extending the initial time to notify the subscriber about the time extension; and discontinuing the in-flight network access for the subscriber after the time extension lapses and the user has no in-flight network access time remaining.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION OF THE DRAWINGS

Figure 1:
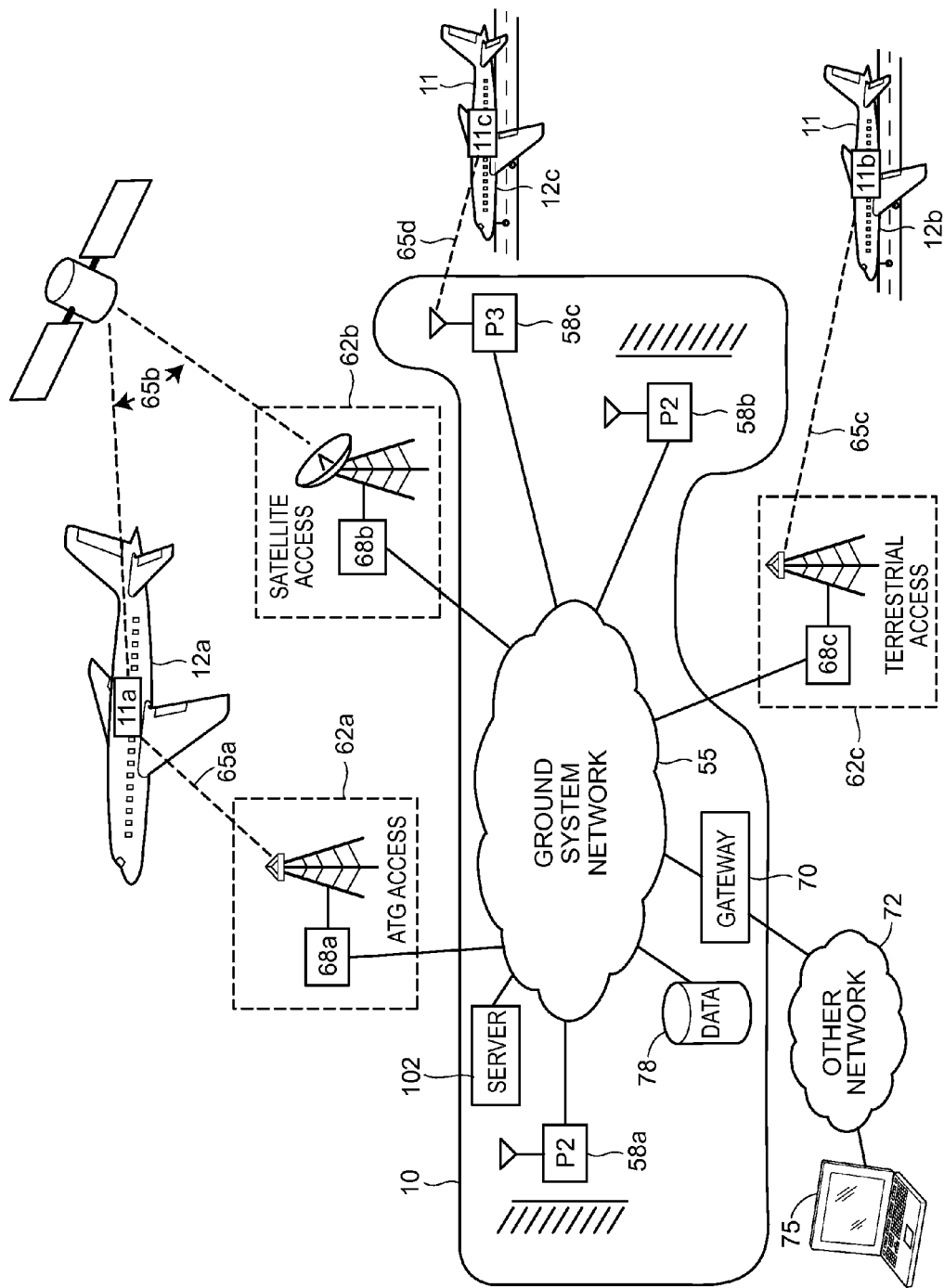
FIG. 1 is a diagram of an example of a ground based vehicle communication system for delivering data to and from devices on-board a vehicle (e.g. airplane), according to an embodiment.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

In-Flight Network Access Timed Products

Many organizations strive to enhance commercial aviation customer satisfaction by offering additional services to airline passengers during the flight. One such service is in-flight network access. In-flight network access empowers passengers to enjoy data network access from their computing devices (e.g., smartphones, tablet computers, laptop computers, personal digital assistants, e-readers, smartwatches, etc.) while in transit similar to how passengers normally enjoy network access from their devices while not in transit. Specifically, airline passengers can use in-flight network access to surf the Internet, read and/or write e-mails, view blogs, view and post messages or pictures or other data, and/or complete other activities requiring network access, all while cruising at altitudes above 10,000 feet.

In one embodiment, in-flight network access may be provided to customers (i.e., subscribers, users, and/or airline passengers in some embodiments) by three types of hardware working together. These types include a ground based communication system, a vehicle communication system, and communication links between the two systems. The ground based communication system allows hardware on the ground to access various data networks (e.g., internet, proprietary network, virtual private network, etc.) that a customer may typically access while not in transit. The vehicle communication system provides a network for passengers to communicate and transmit data while in transit. The communication links rely on satellite links, air-to-ground link (ATG), or other links, to connect the ground-based and vehicle communication systems. Thus, the systems and links work together to provide an in-flight network to passengers aboard a plane while in transit.

Errors or issues with any of the three types of hardware can cause the in-flight network to be unavailable. For example, if an airline flies through an area with poor coverage, data transmissions to and from airline flight passengers may not be completed due to degraded network performance as a result of the poor coverage. Specifically, the communication links (satellite, ATG, etc.) may be unable to transmit data between the ground based and vehicle communication systems in a poor coverage area.

Thus, the systems and/or links providing in-flight network service should monitor in-flight network availability and provide remedial measures if the network is unexpectedly unavailable. By providing remedial measures, the organization may mitigate some customer frustration arising from unavailable in-flight networks. The organization can determine appropriate remedial measures based on a passenger's data delivery service plan for in-flight network access.

In one embodiment, in-flight network access may be provided to a customer account based on a timed product. Specifically, a customer (i.e., airline passenger) can purchase access to one or more in-flight networks for a period of time in exchange for a fee. In some embodiments, the timed product may be for one month, one day (24 hours), or three hours. The one month timed product may provide in-flight network access to a customer for a month specified by the customer. In some embodiments, the monthly timed product automatically renews to provide the customer in-flight network access for the following month.

The one day timed product may provide in-flight network access for a full day specified by the customer. Alternatively, the one day timed product may grant the customer in-flight network access spanning 24 continuous hours beginning when the customer first accesses the in-flight network and/or activates his account. In some embodiments, the daily pass expires within one year of purchase.

The three-hour timed product may also provide three continuous hours of in-flight network access beginning when the customer first accesses the in-flight network and/or activates his account. Alternatively, the three-hour timed product may provide the customer three hours of in-flight network access to use at the customer's discretion. This may allow the customer to split the three hours of in-flight network access across multiple flights for multiple days. For example, a customer may use one hour of in-flight network access on a first flight on a first date, a second hour of in-flight network access on a second flight on a second day, and the remaining time of in-flight network access on a third flight on a third date.

The timed products may be further restricted to specific airlines, such as one preferred airline of the customer. Alternatively, the timed product may be available for customers on any airline supporting the service. The timed product may be an alternative to a data quantity product (i.e., a fee from the user in exchange for a quantity of data allowed for transfer over the in-flight network). Thus, in some embodiments, the timed product may be provided without limits on data transfer for the user via the in-flight network.

Unavailable in-flight networks can also result in customer frustration with respect to timed products. For example, if a customer has purchased in-flight network access for 24 continuous hours, and cannot access the in-flight network during the 24-hour timed product period due to the network being unavailable, the customer will likely be frustrated with the purchase and service. First, the customer could not access the network when he wanted to. Second, the customer lost part of the 24 hours of network that the customer purchased.

Alternatively, a customer with a non-continuous three hour timed product would not lose any of his 3 hours of in-flight network access due to an unavailable network. However, the customer would be unable to access the network when he wanted to. For both scenarios, the unavailable in flight network would likely frustrate either customer with his purchase and the service.

One approach to mollifying the customer in this case is for the systems providing the in-flight network to automatically detect if the in-flight network is unavailable for a portion of the flight when the network should be available. If this happens, the systems can automatically add in-flight network access time to the customer accounts. For example, the system could add another day of in-flight network access time to the customer's account. By compensating customer accounts with additional in-flight network access time in response to unavailable in-flight networks, customer frustration regarding timed products may be lessened. The following figures and accompanying description provide details about implementations and/or variations of providing timed products for in-flight network access.

Ground-Based Communication System

FIG. 1 is a diagram of an example of a ground-based vehicle communication system environment 100. The environment 100 includes a ground-based communication system 10, a vehicle communication system 11, an air to ground (ATG) access network 62*a*, satellite access network 62*b*, terrestrial access network 62*c*, and/or access port networks 58*a-c*. In some embodiments, the environment 100 includes more, less, and/or different components than those displayed in FIG. 1.

The system 10 is "ground based" as a majority of the devices included in the system may be essentially terrestrially located. For example, the devices may be respectively disposed within structures that are connected to the ground (such as within structures that are not air-borne or water-borne). The system 10 can deliver data for distribution to a vehicle 12*a-c* while the vehicle 12*a-c* is in transit or stationary.

The ground-based communication system 10 may include a network 55 via which information, data, and/or communications are delivered to vehicles 12*a-c* and/or predicted locations. The network 55 may be a public network, a private network, or some combination of a public and a private network. The network 55 may be a communications network, a data network, a packet network, or some combination thereof. The network 55 may be a hosted network, or may be a peer-to-peer or other type of ad-hoc network. Further, the network 55 may use any known networking technology to deliver data to vehicles. Generally, the network 55 may include a plurality of computing devices that are in communicative connection.

Also, the system 10 may include one or more gateways 70 to other networks 72. Generally, a gateway 70 may include one or more computing devices in communicative connection. In some embodiments, at least some of the computing devices included in the gateway 70 may also be included in the network 55. The other networks 72 in communicative connection with the gateway 70 may include, for example, the Internet or some other public network. The other networks 72 may alternatively or additionally include one or more private networks. In an embodiment, a user may access the system 10 via a computing device 75 or other user interface that is communicatively connected to the gateway 70 via the one or more networks 72. For example, the user may access the ground-based communication system 10 at the computing device 75 via a website that may be hosted in the network 55 and accessed via the gateway 70. User access to the ground-based communication system 10 may be controlled, and may require granting of access permission. In an embodiment, a user 75 may access a private account stored in and administered by the network 55.

Further, the system 10 may include one or more data storage devices 78. The one or more data storage devices 78 may use any known data storage technology, such as data banks, data warehouses, servers, data farms, cloud storage, and the like. At least a portion of the data storage devices may be accessed (e.g., read, write, modify, delete, add, etc.) by computing devices included in the network 55. In an embodiment, one or more of the port networks 58*a-58c*, the access networks 62*a*, 62*b*, server 102, and/or the gateways 70 may access at least a portion of the data storage device(s) 78. The data storage devices 78 may store data corresponding to each of the vehicles 12. For example, the data storage devices 78 may store one or more user accounts, which may correspond to a particular vehicle, fleet of vehicles, customer or system user, company, and/or other types of accounts. Additionally, the data storage devices 78 may store information or data for each vehicle and/or system user for remote loading onto or off-loading from vehicles 12. In an embodiment, the data corresponding to the vehicles 12 may include user preferences for selecting data transfer bearers. The one or more data storage devices 78 may be redundant, or may otherwise provide a desired level of security and data integrity.

Figure 3:
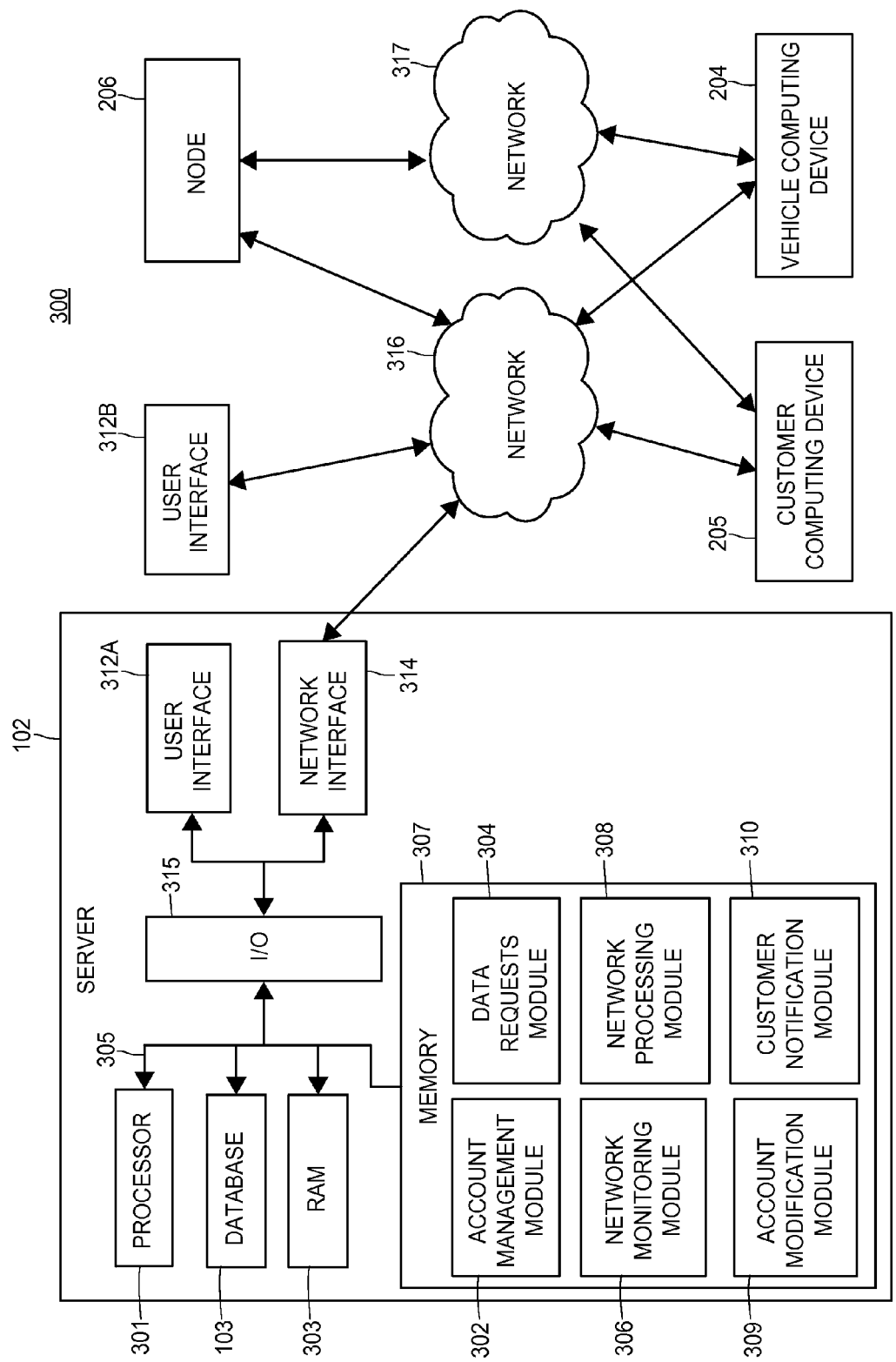
FIG. 3 is a block diagram of an example of a ground based vehicle communication system implementation, according to an embodiment.

Additionally, the system 10 may include server 102 to further implement the system 10. The system 10 may receive, format, organize, store, process, update, modify, transmit, transfer, and/or analyze data from computing devices aboard a vehicle 12 via the system 11, access networks 62*a-c* and/or port networks 58*a-c*. The server 102 may include more than one server. In this case, the multiple servers 102 may work together to provide a platform that supports the system 10. FIG. 3 describes server 102 in more detail.

The data delivered via the system 10 to vehicles 12 and/or devices on-board the vehicles 12 may include any type of data. For example, the data may include user-consumable content data such as a text message, a web page, a media file, an audio file, a video file, streaming data, and/or a response to a previous request received from a vehicle communication system 11 of the vehicle 12. In some cases, the data delivered to vehicles 12 and/or devices on-board the vehicles 12 includes data that is to be presented at a user interface of a device on-board the vehicles 12. In some scenarios, the data delivered to vehicles 12 and/or devices on-board the vehicles 12 may be an application, a configuration, an update, or software that a user has requested to be downloaded.

The ground-based communications system 10 may also include port networks 58a-c. However, in other embodiments, the system 10 includes more, less, and/or different components than those displayed in FIG. 1.

Vehicles

Each vehicle 12a-c includes a vehicle communication system 11. The vehicle communication system is described further in FIG. 2 and its accompanying description. The system 11 allows the vehicle 12a-c to receive data from the ground-based communication system 10. The vehicle communication system 11 also provides data to users in the vehicle 12a-c. Further, the vehicle communication system 11 accommodates data requests from users in the vehicle 12a-c.

The vehicle communication system 11 may receive data from the ground-based communication system 10 and accommodate data requests from users on the vehicle 12a-c by relying on one or more access networks. These access networks include air to ground (ATG) access network 62a, satellite access network 62b, terrestrial access network 62c, and/or port networks 58a-c. By relying on various networks, the vehicle 12a-c can receive data and accommodate data requests from users on the vehicle 12a-c while the vehicle is stationary and/or in transit. Although FIG. 1 displays several access networks for the vehicle communication system 11 to communicate with the ground based communication system 10, more, less, and/or different components may be used by the vehicle communication system 11 to communicate with the ground-based communication system 10.

Each of the vehicles 12a-c may be owned and/or operated by an individual or multiple people. Further, each of the vehicles 12a-c may be owned and/or operated by one or more companies, organizations, and/or government entities. Also, each of the vehicles 12a-c may be owned and/or operated by different individuals, people, companies, organizations, and/or government entities. In some cases, each of the vehicles 12a-c is one of a fleet of vehicles. In some embodiments, at least one of the vehicles 12a-c may be used to transport passengers who pay for or otherwise are granted passage on the vehicle. In some embodiments, at least one of the vehicles 12a-c may be used to transport executives or staff of a company or organization and their guests. In some embodiments, at least one of the vehicles 12a-c may be used to transport live or inanimate cargo such as packages, mail, equipment, goods, products, livestock or other animals, plants, scientific samples, organs for transplant, and/or other types of cargo. In some embodiments, vehicles 12a-c may transport both people and cargo. Furthermore, although FIG. 1 depicts the vehicles 12a-c as aircraft, the techniques and principles described herein may be applied to other types of vehicles such as automobiles, buses, trains, boats, ships, barges, subway cars, helicopters, ambulances or other emergency vehicles, military vehicles, other air-borne, water-borne, or land-borne vehicles, and vehicles that are suitable for space travel.

Port Networks

The network 55 of the ground-based communication system 10 may be communicatively connected to one or more networks 58a-c, each of which may be located and/or hosted at a respective port, terminal, station or way station, dock, bay, garage, vehicle maintenance location, or other location at which vehicles may be parked or stationed for a temporary amount of time. Such locations are generally referred to herein as a "port."

Generally, a port may be a designated location from which vehicles may depart and/or arrive. Examples of ports may include airports, helicopter pads, harbors, railroad stations, hospitals, shipping terminals, bus terminals, fueling stations, vehicle maintenance or service areas, military bases, ports or aircraft carriers, and/or other arrival/departure locations. A vehicle 12 may begin a travel route or a leg of a travel route from a particular port, and a vehicle may end a travel route or a leg of a travel route at another port. Some ports may be intermediate stops along a vehicle's travel route. A vehicle 12a-c may be stationed at a port to load or unload passengers, cargo, fuel, equipment and/or supplies.

In FIG. 1, ports P1, P2, and P3 ("port networks") correspond to networks 58a, 58b, and 58c, respectively. In an embodiment, port networks 58a-c may provide vehicles 12a-c access to the ground-based communication system 10 when the vehicles are at the ports. While FIG. 1 shows the system 10 including three port networks 58a-c, the ground-based communication system 10 may include more or less port networks then displayed.

In some cases, a single port or location may be serviced by more than one port network. In some embodiments, one or more port networks 58a-58c may be excluded from the ground-based communication system 10, but may still be in communicative connection with the ground-based communication system 10, for example, if the ground-based communication system 10 and a particular port network are operated by different providers.

Port networks 58a-c may be private networks, public networks, or some combination of private and public networks. Generally, a port network 58a-c may include one or more computing devices which are communicatively connected and that are situated in and around the port. A port network 58a-c may include a single computing device or may include multiple computing devices arranged in a local network configuration. In some embodiments, at least some of the computing devices included in the port network 58a-58c may also be included in the network 55. When a vehicle 12c has arrived at a particular port and is parked, stationed or moving about the port, vehicle 12c may communicate with port network 58c via a wireless or wired connection 65d. For example, the vehicle 12c may communicate with the port network 58c using a Wi-Fi™, WLAN (Wireless Local Access Network), or other type of wireless connection. In another example, the vehicle 12c may communicate with the port network 58c using a wired connection, such as a wired Ethernet or T1 connection.

In an embodiment, the vehicle 12c may communicate with one of the port networks 58a-58c using a vehicle communication system 11. The vehicle communication system 11 may include a plurality of interfaces to a plurality of bearers or communication channels, such as the bearers 65a-65d illustrated in FIG. 1. In an embodiment, at least one of these bearers may include a wireless communication channel 65d to a port network 58c. In another embodiment, at least one of the bearers may include a wired connection to the port network 58c (not shown). The plurality of interfaces included in the vehicle communication system 11c may be fixedly connected to the vehicle 12c, in an embodiment. For example, the plurality of interfaces may be included in one or more Line Replaceable Units (LRUs) or other objects that are fixedly attached to the vehicle 12c.

In an embodiment, the vehicle 12c may detect and communicate with the port network 58c using a wireless protocol. Also, other wireless communication protocols (either public or private) that enable discovery and communication may be used. In an embodiment, the vehicle 12c (or its vehicle communication system 11c, in some embodiments) and a computing device of the port network 58c may discover and authenticate one another and may establish a publisher/subscriber relationship to transfer data between the vehicle 12c and the port network 58c. Data may be delivered to the vehicle 12c from the port network 58c and may be received from the vehicle 12c by the port network 58c while the vehicle 12c is stationed at the port or otherwise is in communicative connection with the port network 58c, e.g., while the vehicle 12c is parked, taxiing or moving about the port location.

Other Access Networks

Alternatively, while a vehicle 12 is traveling a route and/or between an origination point and a destination point (e.g., vehicles 12a and 12b), and is not near or in communicative connection with any port, the vehicle 12 may communicate with the ground-based communication system 10 using one or more access networks 62a-62c (e.g., vehicles 12a-12c). In the displayed embodiment of FIG. 1, an airplane vehicle communication system 11 would generally rely on either access networks 62a or 62b to communicate with the ground-based communication system 10 while in flight (vehicle 12a). Generally, an access network 62a-62c may include one or more computing devices that are communicatively connected. The access network 62a-62c may include a single computing device or multiple computing devices arranged in a local network configuration. The computing devices may be located near one or more access point antennas. In some embodiments, at least some of the computing devices in the access network 62a-62c are also included in the network 55. One or more access networks 62a-62c may be included in the ground-based communication system 10 so that vehicles may be in communicative contact with the system 10 during transit. In some embodiments, one or more access networks 62a-62c may be excluded from the system 10 but still may be in communicative connection with the system 10, such as when respective providers of the ground-based communication system 10 and of a particular access network are different businesses or organizations.

Typically, the access networks 62a-62c coupled to the network 55 may support wireless communications and use any suitable wireless technology. For example, the access network 62a may be an air-to-ground (ATG) network that utilizes an EVDO (Evolution Data Optimized) protocol to communicate with a vehicle 12a over one or more designated channels 65a (e.g., the 849-851 MHz and 894-896 MHz frequency bands). The access network 62a may include a computing device 68a that is in communicative connection with the network 55 and with the channel(s) 65a to support data transfer between the vehicle 12a and the network 55. In another example, the access network 62b may be a satellite communications network, such as a satellite communications network that utilizes the $K_u$ band (e.g., 12-18 GHz), the $K_a$ band (e.g., 26.5-40 GHz) or other band suitable for satellite data communications (denoted generically in FIG. 1 by the reference 65b). The satellite access network 62b may include a computing device 68b that is in communicative connection with the network 55 and with the communication channel(s) 65b to support transfer of data between the vehicle 12a and the network 55 using the satellite communication channel(s) 65b.

In yet another example, the access network 62c may be a terrestrial access network that utilizes cellular or mobile wireless protocols (e.g., TDMA (Time Division Multiple Access), GSM (Global System for Mobile Communications), CDMA (Code Division Multiple Access, LTE (Long Term Evolution), and/or other mobile communications technologies) over corresponding bands to transfer data between the ground-based communication system 10 and terrestrial vehicles, e.g., the vehicle 12b. In an embodiment, a terrestrial vehicle 12b may include a vehicle communication system 11b for transferring data to and from the vehicle 12b. The terrestrial access network 62c may include a computing device 68c in communicative connection with the network 55 and with the communication channel(s) 65c to support transfer of data between the vehicle 12b and the network 55.

Although FIG. 1 illustrates the ground-based communication system 10 as including three access networks 68a-68c, the ground-based communication system 10 may include or be in communicative connection with more, less, and/or different access networks than those displayed. Also, each access network 62 may utilize any known wireless communication or data technology to transfer data to and/or from a moving vehicle 12. For example, at least some of the access networks 62a-62c may be of different types (e.g., satellite, terrestrial access, ATG, Wi-Fi, etc.). In some embodiments, a data or information transfer session or call may be handed off from one access network 62a to another 62b. Hand-offs may be performed between access networks of different types and using different communication technologies, in an embodiment.

Vehicle Communication System

Figure 2:
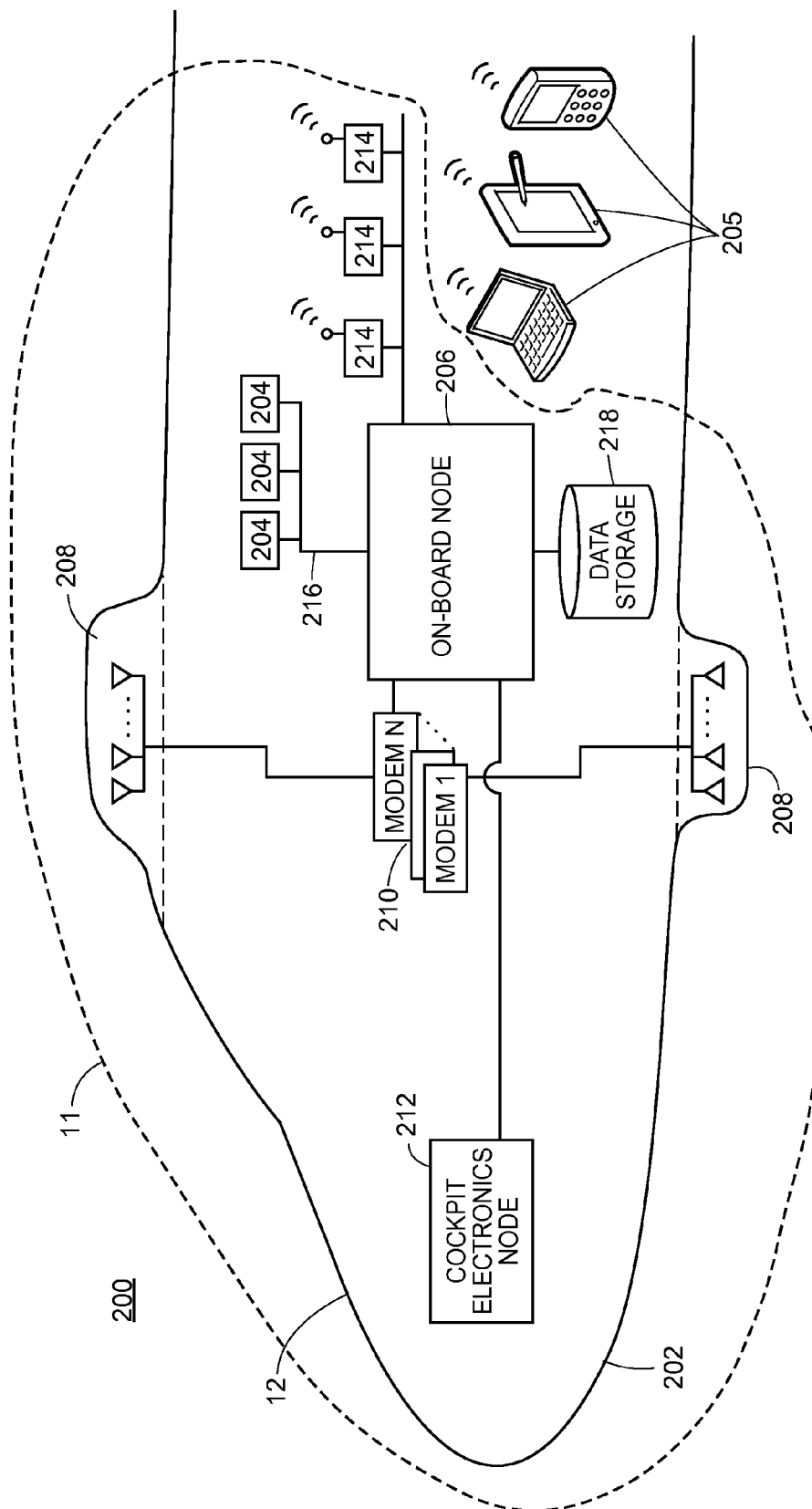
FIG. 2 is a diagram of an example of a vehicle communication system configured to receive data onto the vehicle and deliver the received data to a recipient device that is on-board the vehicle, according to an embodiment . . . .

FIG. 2 illustrates an example vehicle communication system 11 in a vehicle 12 that may receive information or data onto the vehicle 12 from the ground-based communication system 10. Additionally, the system 11 may cause feedback information to be delivered from the vehicle 12 to the system 10. Further, the system 11 may cause data to be delivered to and/or received from one or more devices 204, 205 being transported by the vehicle 12. In the displayed embodiment, the vehicle 12 is a plane with a system 11 that accommodates data requests during transit from devices 205 and/or 204 by providing an in-flight network (explained in further detail in FIG. 3). While the displayed embodiment of FIG. 2 shows the vehicle 12 is a plane, in other embodiments, the vehicle 12 is a different type of vehicle.

The example vehicle communication system 11 includes one or more antennas 208 that are communicatively connected to one or more modems or transceivers 210. Each of the one or more antennas 208 may receive and transmit signals via a different respective frequency band allocated for wireless communications, e.g., the $K_a$ band, the L band, the $K_u$ band, the WiMAX band, the Wi-Fi band, a terrestrial cellular band, or any other suitable wireless communication frequency band, which may be terrestrial or non-terrestrial. Each of the antennas 208 may be communicatively connected to an associated modem or transceiver 210 that is fixedly connected to the vehicle 12 and is configured to modulate, demodulate, encode and decode information and data corresponding to signals at the respective antenna 208, in an implementation.

The one or more modems or transceivers 210 may include a respective modem or transceiver that is compatible with TDMA (Time Division Multiple Access), GSM (Global System for Mobile Communications), CDMA (Code Division Multiple Access), LTE (Long Term Evolution) communications, WiMAX, and/or any other terrestrial mobile communications technology. In some embodiments, the one or more modems 210 may include a respective modem or transceiver that is compatible with EVDO (Evolution Data Optimized) or Wi-Fi communications technologies. The vehicle communication system 11 may include any number of antennas 208 and associated modems or transceivers 210 to support any desired number of different wireless communication technologies. A modem 210 may be used in a bi-directional configuration or a receive-only configuration.

The example vehicle communication system 11 includes an on-board node 206, such as an Auxiliary Computer Power Unit (ACPU), that may be a computing device communicatively connected to one or more access networks 62a-62c via the one or more antennas 208 and/or one or more modems or transceivers 210. The node 206 may accommodate data requests from devices 204 and/or 205 by communicating with the ground-based communication system 10. Alternatively, the node 206 may satisfy the data requests from the devices 204 and/or 205 from within the vehicle communication system 11. The node 206 may also accommodate requests from the system 10 and send vehicle 12 and/or vehicle communication system 11 feedback to the system 10.

In addition, when the vehicle 12 is an aircraft, a cockpit electronics node 212 may be communicatively coupled to the on-board node 206. The cockpit electronics node 212 may be an LRU configured to collect electronic information from various instruments in the cockpit of the aircraft, e.g., during flight. In some cases, the cockpit electronics node 212 may provide collected flight information such as altitude, airspeed, aircraft position, aircraft direction, or other flight state information to the on-board node 206 and/or the ground-based communication system 10.

At least some of the customer computing devices 205 may be mobile computing devices, such as smartphones, tablet computers, laptop computers, personal digital assistants, e-readers, smartwatches, etc., that are capable of establishing a wireless communicative connection with the on-board node 206 via one or more wireless access points 214, e.g., via a wireless network interface. Some of the devices 204 may be wired computing devices that are communicatively connected to the on-board node 206 via a wired network 216.

In some implementations, one or more of the vehicle computing devices 204 may be an on-board data storage entity 218 that may store various types of data to distribute to other devices and/or receive data from other devices 204, 205. Examples of the stored data that is received or sent by node 206 include entertainment content, media files, audio files, video files, document files, emails, message, text messages, software, configurations, web pages, account information, usage data, applications that may be installed, information identifying the devices 205, payment information (e.g., encrypted financial account information), digital rights management (DRM) keys, and/or any other data that is desired to be stored, at least temporarily, on-board the vehicle 12. In some embodiments, the data is stored at device 218 to facilitate the node 206 accommodating data requests from devices 204 and/or 205.

Ground Based Communication System and Vehicle Communication System Implementation: Server 102

FIG. 3 is a block diagram of a ground-based communication system and vehicle communication system implementation 300, according to one embodiment. The system 300 may be implemented by server 102 in communication over networks 316 and 317 with other devices. Server 102 may communicate over network 316 with customer computing device 206, vehicle computing device 204, and customer computing device 205. Additionally, the server 102 may be accessed over the network 316 by user interface 312B. In some embodiments, fewer or more devices communicate with server 102 over network 316. In some embodiments, different devices communicate with server 102 over network 316.

Server 102 may be, for example, a computer, a server, a plurality of networked computing devices having a logical appearance of a single computing device, a plurality of cloud computing devices, etc. Accordingly, for ease of discussion only and not for limitation purposes, the server 102 is referred to herein using the singular tense, although in some embodiments the server 102 may include more than one physical computing device.

The server 102 may include a memory 307, a processor 301 (may be called a controller, a microcontroller, or a microprocessor), a random-access memory (RAM) 303, and an input/output (I/O) circuit 315, all of which may be interconnected via an address/data bus 305. The memory 307 may comprise one or more tangible, non-transitory computer-readable storage media or devices, and may be configured to store computer-readable instructions that, when executed by the processor 301, cause the server 102 to implement the ground-based communication system 10 and vehicle communication system 11.

The user interfaces 312A and 312B may be used to access server 102 to retrieve, transmit, access, view, update, upload, download, and/or modify server information. The user interfaces 312A and 312B may be used by a customer or an agent of the organization implementing systems 10 and 11 to provide in-flight networks. The user interface 312A may be integral to the server 102. Alternatively, the user interface may not be integral to the server 102, such as user interface 312B. For example, user interface 312B may be a remote user-interface at a remote computing device, such as a webpage or client application.

The database 103 may be configured or adapted to store data related to ground-based communication system, vehicle communication system 11. For example, the database 103 may store account information for one or more customer computing devices 205 and/or customers, information for one or more nodes 206, information for one or more computing devices 204, etc. Database 103 may store other data relevant to systems 10 and/or 11. Database 103 may be located at server 102. Alternatively, the database 103 may be located remotely from server 102. In some cases, when database 103 is located remotely from server 102, the database 103 may be part of data storage devices 78. Furthermore, parts of the database 103 may be located at the server 102 while other parts of the database 103 may be located remotely from server 102.

Although only one processor 301 is shown, the server 102 may include multiple processors 301. Additionally, although the I/O circuit 315 is shown as a single block, it should be appreciated that the I/O circuit 315 may include a number of different types of I/O circuits. Similarly, the memory of the server 102 may include multiple RAMs 303 and multiple program memories 307. Further, while the instructions and modules are discussed as being stored in memory 307, the instructions and modules may additionally or alternatively be stored in the RAM 303 or other local memory (not shown).

The RAM(s) 303 and program memories 307 may be implemented as semiconductor memories, magnetically readable memories, chemically or biologically readable memories, and/or optically readable memories, or may utilize any suitable memory technology.

Ground Based Communication System and Vehicle Communication System Implementation: Modules Memory 307 may store computer-readable instructions and organize them into modules that can be executed to implement systems 10 and 11. In the displayed embodiment, memory 307 stores account management module 302, data requests module 304, network monitoring module 306, network processing module 308, account modification module 309, and customer notification module 310. In some embodiments, the memory 307 may store different modules than those displayed, while in other embodiments, the memory 307 may store fewer or more modules than those displayed. In some embodiments, the executable computer-readable instructions may not be organized as modules. In some embodiments, instructions may be organized as routines, subroutines, or other blocks of instructions.

Account management module 302 includes instructions executed by processor 301 to accommodate requests received via network interface 314 over the network 316 from a customer computing device 205. Module 302 processes the requests from customers to initiate, register, modify, and/or terminate data delivery service plans for in-flight network access. Additionally, module 302 stores, organizes, and/or updates account information for customers. In some embodiments, module 302 may have more, less, and/or different functions than those described above.

When processing customer requests regarding their accounts, module 302 first receives the request over network 316. Module 302 then processes the request by executing different actions, depending on the request. For example, if the request is for a new data delivery service plan for a new customer, module 302 may retrieve and add relevant account information for the customer's plan. Alternatively, if the request is for a new and/or additional data delivery service plan for an existing customer, module 302 may modify the account of the customer to reflect the revised and/or new data delivery service plan. For example, the plan type, plan time, and applicable airlines, applicable flights, and/or other relevant account information may be updated to reflect the changes in the plan for the customer.

Module 302 may also verify and authorize users to receive a new, and/or different data delivery service plan for in-flight network access. For example, if a request for a plan comes from a customer who is delinquent in paying fees for their accounts, module 302 may elect to not authorize granting the requested plan to the delinquent customer. In other embodiments, other criteria, such as security, bandwidth, pricing, business needs, and/or other relevant factors, are considered before authorizing a customer to receive a data delivery service plan for in-flight network access. Module 302 may receive requests from customers for a data delivery service plan for in-flight network access for a flight prior to boarding, during boarding, or even after boarding, in some cases.

Module 302 also stores, organizes, and/or updates account information for customers regarding their data delivery service plans for in-flight network access. The information may include a plan type, time remaining, applicable flights, applicable airlines, customer information, account history, time delay event history, applicable credits, applicable extended services, and/or any other relevant information regarding the data delivery service plan for in-flight network access for a customer. In some embodiments, account modification module 309 calls account management module 302 to modify an account. In some embodiments, more, less, and/or different modules may call and/or may be called by module 302.

Data request module 304 includes instructions executed by processor 301 to accommodate data requests received by server 102 via the network interface 314 and/or the user interface 312A. Module 304 may accommodate data requests received by the vehicle computing devices 204 and/or customer computing devices 205. In one embodiment, module 304 receives requests from devices 204 and 205 over network 316. Module 304 may accommodate these requests by first retrieving the requested data and then sending the data to the devices via network 316.

Alternatively, module 304 may receive requests from node 206 via network 316. In some cases, the node 206 data requests are in response to data requests from devices 204 and/or 205 received by the node 206 over network 317. In this case, module 304 handles the node 206 requests by first retrieving the requested data and then sending the data over network 316 to node 206. The node 206 may then accommodate data requests from devices 205 and/or 204. Alternatively, module 304 may bypass node 206 to directly respond to the data requests from devices 204 and 205 by sending the data directly to devices 205 and 204 over network 316. In other embodiments, module 304 may receive data requests from more, less, and/or different nodes and/or computing devices than those described.

In some embodiments, the data requests received by module 304 from device 204 are for data including entertainment content, media files, audio files, video files, web pages, software, firmware, applications, document files, identifying information, payment information (e.g., encrypted financial account information), and/or other types of data. Meanwhile, data requests received from device 205 may be for data including entertainment content, media files, audio files, video files, web pages, streaming data, software, applications, configurations, document files, emails, messages, text messages, and/or other types of data. In some embodiments, the types of data received by devices 204 and 205 may be more, less, and/or different than the types of data described above.

Figure 4:
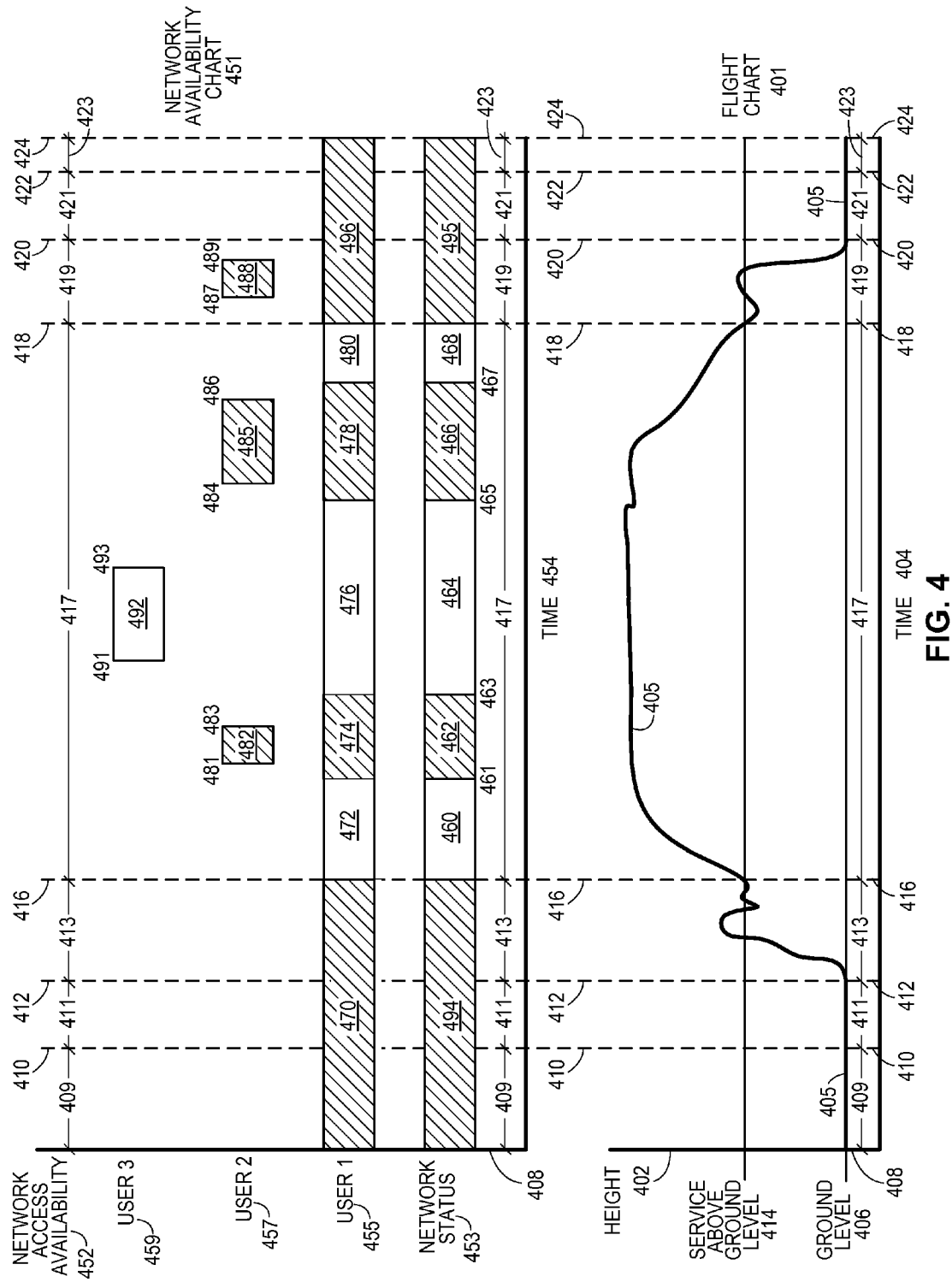
FIG. 4 is a network timing diagram illustrating examples of how a customer may be affected during a network degradation event, according to an embodiment.

Network monitoring module 306 includes instructions executed by processor 301 to monitor the status of networks 316 and 317. Module 306 monitors the status of both networks to determine whether an in-flight network, such as network 317, suffers a network degradation event. A network degradation event occurs when the in-flight network experiences diminished network connectivity. FIG. 4 provides additional details regarding network degradation events.

Module 306 may also collect data about networks 316 and 317. For example, module 306 may collect data including network status, reduced network connectivity duration, reduced network connectivity start times and end times, and/or other relevant data regarding network status for both networks. This data may allow the systems 10 and 11 to determine the cause of a network degradation event, and potential troubleshooting mechanisms. Additionally, this data helps the systems 10 and 11 determine how long the network degradation event, and possibly a time delay event, lasted. In some embodiments, more, less, and/or different data is collected for additional, and/or different purposes.

Module 306 may also report network status data, and/or other data collected, for networks 316 and 317 to other modules within server 102. In one embodiment, module 306 reports data to network processing module 308. Module 306 may also report the data to other devices, including node 206. The reported data may be used for further processing of the network degradation events, including determining whether or not the network degradation events can be categorized as a time delay event for one or more customers. In some embodiments, the network status data may be used for other purposes also. In another embodiment, module 306 calls customer notification module 310 to notify customers about the in-flight network being unavailable.

Module 306 may determine network status by communicating with node 206. In some embodiments, module 306 generates and sends status request messages for networks 316 and/or 317 to node 206. Module 306 then may use the feedback received from node 206 to determine data about networks 316 and/or 317. Module 306 may use this data to determine whether a network degradation event has occurred for an in-flight network provided by node 206. In some embodiments, module 306 does not require communications with node 206 to determine data about the networks 316 and/or 317. In some embodiments, module 306 does not require communications with node 206 to determine if a network degradation event has occurred on an in-flight network provided by node 206.

Network processing module 308 includes instructions executed by the processor 301 to determine how the ground-based communication system 10 and vehicle communication system 11 should respond based on network quality determined by module 306. Module 308 determines whether a network degradation event sensed by module 306 should be categorized as a time delay event for one or more customers. If the time delay event occurred, module 308 may call other modules to provide a remedy to the one or more customers that experienced a time delay event.

Figure 5:
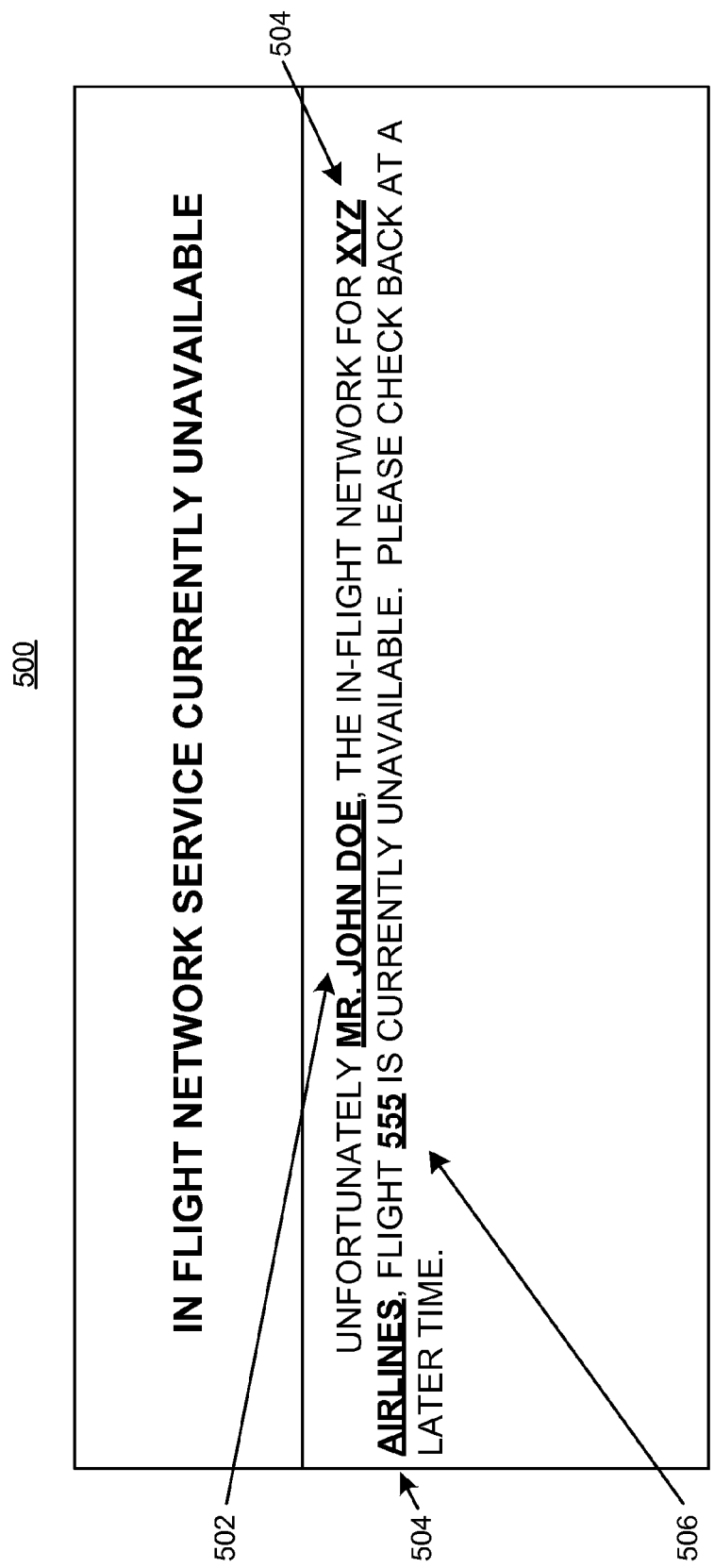
FIG. 5 is an example screenshot of a web page displayed by a web browser notifying a subscriber about a network degradation event, according to an embodiment.

After module 306 obtains network data about networks 316 and 317 and determines network degradation event occurrences, module 308 processes the network degradation events to determine if one or more customers experienced a time delay event. FIGS. 4 and 5 provide additional details about network degradation events and time delay events.

If module 308 determines a network degradation event should be considered a time delay event for one or more customers, the module 308 may call one or more modules in response to this determination. First, the module 308 may call account modification module 309 because a customer suffering a time delay event may need to have their account modified as a remedial measure. Module 308 may also call customer notification module 310 to notify the one or more customers about the time delay event. The module 308 may be called by network monitoring module 306 in response to module 306 determining that a network degradation event occurred. Specifically, module 306 may call module 308 to process the network degradation event to determine if any customer suffered a time delay event.

In some embodiments, more, less, and/or different modules are called by module 308. Furthermore, in some embodiments, more, less, and/or different modules call module 308. Also, the module 308 may perform more, less, and/or different functions than those described above.

Account modification module 309 includes instructions executed by processor 301 to modify account information for one or more customers. In one embodiment, module 309 is called when the account information of a customer is automatically modified at the server 102. For example, in response to a time delay event, the account information of a customer may be modified to add in-flight network access credits to the customer's data delivery service plan. Further, module 309 may determine how much to modify the account information of a customer in response to a time delay event. Alternatively, module 309 may be called to provide other credits in response to a time delay event. Additional details regarding remedial measures are provided in FIGS. 4-6.

Customer notification module 310 includes instructions executed by processor 301 to generate notification messages for customers and execute customer notifications. Module 310 may notify customers about account modifications, such as modifications completed by module 309, including modifications adding additional in-flight network access time to a customer's account, adding credits of other types to a customer's account, and/or other modifications. Account modification notifications generated by module 310 may be sent to the customer via email, text message, letter, phone call, conversation, account notification digital message, or some other communication. In this embodiment, the module 310 may be called by module 309.

Alternatively, module 310 may be used to notify customers when an in-flight network is unavailable. In one embodiment, a webpage is generated for display at a device 205 one a data request by a device 205 cannot be accommodated by the systems 10 and/or 11. In another alternative, module 310 may be called to notify a customer about unavailable data access (e.g., entertainment content, movies, television, songs, applications, software files, configurations, video files, audio files, streaming data, and/or other data) and/or activities (email, messaging, text messaging, phone calls, gaming). In the above embodiments, the module 310 may be called by modules and 304, 306, and/or other modules. In some embodiments, the module 310 provides notifications to devices 205 for another purpose.

Ground Based Communication System and Vehicle Communication System Implementation: Networks and Nodes The server 102 may be operatively connected to send and receive data over the network 316 via I/O circuit 315 and network interface 314. The server 102 may connect to the network 316 at the network interface 314 via a wired or wireless connection, or other suitable communications technology. The network 316 may be one or more private or public networks. The network 316 may be a proprietary network, a secure public internet, a virtual private network or some other type of network, such as dedicated access lines, plain ordinary telephone lines, satellite links, combinations of these, etc. Where the network 316 comprises the Internet, data communications may take place over the network 316 via an Internet communication protocol, for example. The network 316 may include one or more terrestrial access networks, port networks, air to ground access networks, and/or satellite access networks, as described in FIG. 1. In one embodiment, network 316 is the air to ground access network 62a described in FIG. 1. In some embodiments, the network 316 is used for a device (i.e., server 102) outside of vehicle 12 (see FIG. 1) to communicate with a device aboard the vehicle 12 (i.e., node 206). In some embodiments, the server 102 communicates with devices 204, 205 via the network 316. In one embodiment, the server 102 communicates with devices 205 over network 316 for device 205 to register to receive a data delivery service plan for in-flight network access.

Network 317, on the other hand, is generally used for devices aboard the vehicle 12 (i.e., device 204 and/or 205) to communicate with another computing device aboard the vehicle 12 (i.e., node 206). The network 317 may be a wired network, a wireless network, and/or a combination of wireless and wired networks. In some cases, network 317 is an in-flight network. An in-flight network may be a network available on an airplane flight for passengers to use to send and/or receive data during the flight. In one embodiment, node 206 communicates with one or more customer computing devices 204 via a portion of the network 317 that is a wireless network. In another embodiment, node 206 communicates with one or more vehicle computing devices 205 via a portion of the network 317 that is a wired network. While FIG. 3 displays communications occurring between devices over networks 316 and 317, in other embodiments, devices communicate over more, less, and/or different networks than those displayed in FIG. 3.

Similar to the server 102, and as mentioned earlier in FIG. 2, the node 206 may be for example, a computer, a server, a plurality of networked computing devices having a logical appearance of a single computing device, a plurality of cloud computing devices, etc. In one embodiment, the node 206 may be an Auxiliary Computer Power Unit (ACPU). Similar to server 102, the node 206 may include a memory, a processor, a RAM, and an I/O circuit, all interconnected by a bus. The memory may store instructions for the processor to execute to allow the node 206 to further implement the system 11. Node 206 may also include a network interface to access networks 316 and/or 317, and a user interface to allow users to access the node 206, similar to server 102. However, in some embodiments, the node 206 is configured differently from the server 102.

The memory for node 206 may also store instructions corresponding to modules similar to those on the server 102. For example, the memory of the node 206 may also include instructions for an account management module, a data requests module, a network monitoring module, a network processing module, an accounts modification module, and a customer notification module. However, the node 206 may include more, less, and/or different modules than those displayed and described for the server 102. Additionally, the modules for node 206 may operate differently from the modules described for server 102.

For example, in one embodiment, node 206 may also include an account management module to manage account information while accommodating user requests. In some cases, when the node 206 receives a data request from a device 205 for the first time during the flight, the node 206 may call the account management module to verify the user and/or device 205 are authorized to access the in-flight network. The module may then authorize the user and/or device 205 to access the in-flight network and proceed to process the received data request. Alternatively, the module may deny the user and/or device 205 in-flight network access.

The node 206 may communicate with the server 102 over network 316. Additionally, the node 206 may communicate with customer computing device 205 and vehicle computing device 204 over the network 317. In one embodiment, the node 206 receives data requests from device 205 and accommodates the data requests by transmitting data back to the device 205 over the network 317. The node 206 may also send data to and receive data from device 204. The data could include entertainment content, media files, audio files, video files, web pages, applications, software, configurations, document files, emails, messages, text messages, and/or other types of data. In some embodiments, the node 206 may communicate more, less, and/or different data to more, less, and/or different devices over network 317 than the data and/or devices described.

Node 206 may send data to and receive data from server 102 over network 316. The transmitted data could include data to accommodate data requests from devices 204 and/or 205. Thus, the data could include entertainment content, media files, audio files, video files, applications, software, configurations, document files, emails, messages, and/or other types of data. Alternatively, the data could include account information for users, in-flight network information (e.g., network status), feedback information regarding the in-flight network, flight information, and/or other information. In some embodiments, the node 206 may communicate more, less, and/or different data to more, less, and/or different devices over network 316 than the data and/or devices described.

Flight and Network Availability Charts

FIG. 4 is a network timing diagram illustrating examples of how different customers may be affected by the availability of an in-flight network. FIG. 4 includes flight chart 401 and network availability chart 451. Flight chart 401 displays the heights of a particular flight at various times during the flight, starting from when passengers begin boarding the flight all the way through when passengers deplane. Chart 451 displays availability of the network at various times during a particular flight. Chart 451 also demonstrates how different users attempting to access the network at various times during the flight are affected. Although the displayed embodiment of FIG. 4 is for an airplane flight, similar principles may apply to other types of vehicles, such as automobiles, buses, trains, boats, ships, barges, submarines, or other air, space, land, or water vehicles.

Charts 401 and 451 are related because both charts are plotted along the same horizontal axis (x-axis), which is time (404 or 454). Thus, at a given time, charts 401 and 451 describe how a flight at a particular height and the availability of the in-flight network may affect various users trying to access the network. Because chart 451 is displayed directly above chart 401, determinations about how flight height and network availability affect users can be more easily determined. However, in some embodiments, more, less, and/or different charts and data may be displayed to assess network availability during different parts of flight. Further, a different arrangement of the charts than the displayed arrangement may be used to determine network availability during a flight.

Flight Chart 401

Flight chart 401 includes various components. Chart 401 includes x-axis 404 displaying different values of time, and vertical axis (y-axis) 402 for the height of the flight. The x-axis has several time reference lines plotted, including lines 410, 412, 416, 418, 420, 422, and 424. Each line represents a particular point in time of the flight and corresponds to a beginning and/or end of a stage of the flight. Meanwhile, the various stages of the flight are labeled by 409, 411, 413, 417, 419, 421, and 423. The ground level line 406 corresponds to a flight height value of 0 feet at any time during the flight. The service above ground level line 414 represents the minimum flight height at which in-flight network access is permitted. The service above ground level value may be generated by a government agency, such as the Federal Aviation Administration (FAA). In one embodiment, service above ground level is equal to 10,000 feet. Flight line 405 displays the altitude of the particular flight at the various times and stages of the flight. In some embodiments, chart 401 may include more, less, and/or different components than those shown in FIG. 4 for flight chart 401. Further, the components may be arranged in a different manner than the manner displayed for flight chart 401.

For flight chart 401, the y-axis 402 is dedicated to different values of height for a particular flight. The heights could be provided in any appropriate unit, such as feet, meters, kilometers, miles, yards, and/or other appropriate unit for distance. In some embodiments, categories different from height may be used for the y-axis for flight chart 401. Ground level line 406 and service above ground level line 414 are two lines plotted to demonstrate flight heights for those particular values at any time or stage during the flight. In other embodiments, more, less, and/or different flight height lines may be used than flight height lines 406 and 414.

The x-axis 404 of flight chart 401 is dedicated to different values of time during the particular flight. The time x-axis may be expressed by any one of and/or a combination of appropriate units, such as seconds, minutes, hours, days, months, and years. For example, a flight could board all passengers at 10:00 PM central time on Dec. 31, 2009, and deplane all passengers after the flight by 2:00 AM central time on Jan. 1, 2010. Alternatively, axis 404 may begin with the time value of zero at point 408 and finish with the time value of four hours, zero minutes, and zero seconds at point 424 for the previously mentioned flight. In some embodiments, a category other than time is displayed on the x-axis.

The x-axis 404 of flight chart 401 includes multiple time reference lines 410, 412, 416, 418, 420, 422, and 424. The lines represent points in time during a flight that correspond to the end and/or beginning of a certain stage of the flight. Flight stages are represented by labels 409, 411, 413, 417, 419, and 421. Point 408 corresponds to the beginning of the boarding stage 409 for a flight. During the boarding stage 409, passengers are boarding the plane while the plane is stationary. In some embodiments, the plane is parked at a gate at an airport. The boarding stage of the flight is complete by point 410, at which point the flight begins to move, and thus is no longer stationary. At point 410, the taxiing stage 411 begins. In one embodiment, at point 410, the plane departs from the gate of an airport.

At point 412, the taxiing stage 411 is complete and the plane takes off, thus beginning the initial ascent stage 413. During stage 413, the plane may move above and below the service above ground level line 414 multiple times in a short period of time, otherwise known as "bobbing". Stage 413 lasts until the flight has completed "bobbing" at the service above ground level line 414 and rises above line 414, as shown by time reference line 416. The flight height line 405 rises and remains above the line 414 at point 416 until the flight begins its final descent. Point 416 starts the stage in which the flight is "cruising" at heights above the service above ground level line 414 until beginning the final descent stages.

At point 418 the plane has already begun descending and reduces the height below the service above ground level line 414 height for the first time since point 416. This begins the landing stage 419 which lasts from point 418 until the plane has landed at point 420. The taxiing stage 421 begins at point 420 after the flight has landed and maintains a height equal to the ground level line 406, which in one embodiment is 0 feet. When the taxiing stage 421 ends at point 422, the plane, in some embodiments, is parked at a gate. At 422, the deplaning stage 423 begins and ends at point 424 once all passengers have deplaned. In some embodiments, the chart 401 includes more, less, and/or different points, stages, and/or time reference lines than those displayed.

The chart 401 also includes flight line 405, which displays the height of the flight at any point in time during the flight. In some embodiments, the flight line 405 may have a different trajectory and/or different heights at various times during the flight than those displayed in chart 401.

Network Availability Chart 451

Network availability chart 451 includes various components. Chart 451 includes an x-axis 454 displaying different values of time, and a y-axis 452 displaying network access and/or network availability. The x-axis corresponds to the x-axis of chart 401. As a result, the x-axis includes the same time reference lines, such as 410, 412, 416, 418, 420, 422, and 424, and flight stages, such as 409, 411, 413, 417, 419, 421, and 423. Chart 451 also includes several values along the y-axis, including network status 453, user one 455, user two 457, and user three 459.

For chart 451, the y-axis 452 displays network access and network availability for different identifiers. For identifier network status 453, the y-access displays network availability. For identifiers user one 455, user two 457, and user three 459, the y-axis displays network access. Network status 453 displays the network availability at various times of a particular flight. In the displayed embodiment of FIG. 4, shaded portions of the plotted network status 453, such as section 494, indicate the network status 453 is "unavailable", while clear portions of network status 453, such as sections 460, 464, and 468, indicate the network status 453 is "available." Thus, the network status 453 can be determined to be "available" or "unavailable" at any time during a particular flight.

In some embodiments, network status 453 refers to the status of the in-flight network on the particular flight. Alternatively, network status 453 could refer to the availability of some other network, data, and/or activity while aboard the flight. Examples include in-flight movies, television, songs, applications, software files, video files, audio files, email, messaging, text messaging, phone calls, gaming, and other types of data and activities.

For users 455, 457, and 459, the plotted values indicate times during the flight where a selected user attempted to access the in-flight network. For example, user 455 attempts to access the in-flight network during the entire flight, starting from when the user boards the flight at time 408, until the user deplanes the flight at time 424. Alternatively, user 459 merely attempts to access the in-flight network during a portion 492 of the cruising stage 417. The portion 492 starts at time 491 and ends at time 493. Similar to network status 453, failed attempts to access the in-flight network are shown with a shaded plot (e.g., 470, 474, 478, 482, 485, 488, and 496), while a clear plot represents successful attempts to access the in-flight network (e.g., 472, 476, 480, 492).

In the displayed embodiment of FIG. 4, the chart 451 includes shaded plots of the chart (e.g., 470, 474, 478, 482, 485, 488, and 496) representing unavailable in-flight networks and/or unsuccessful user in-flight network access attempts while the clear plots (e.g., 472, 476, 480, 492) show an available in-flight network and/or a successful attempt to access the in-flight network. In other embodiments, more, less, and or different types of plots are used to represent different in-flight network access statuses and/or different success rates of user attempts to access the in-flight network.

For example, a dotted plot could be used to show a diminished availability of the in-flight network and user data request attempts over the in-flight network, in which some attempts were successful while other attempts were not. In this scenario, a shaded plot representing an unavailable network would mean that none of the attempted data requests by the user were successful. Meanwhile, a clear plot would represent an available network in which most, if not all, of the data requests attempted by the user were successful. However, other embodiments of representing in-flight network statuses and user in-flight network attempts may exist.

The users 455, 457, and 459 may be people and or entities attempting to access an in-flight network during a flight. In some embodiments, a user is a passenger on a flight with a time based product. A user may be a subscriber. In other embodiments, a user may be someone aboard the flight that is not a passenger (i.e., flight attendant). Alternatively, in some embodiments, a user may represent a company with a corporate account providing in-flight network access to its employees during one or more flights. In this case, the company may receive remedial measures, such as discounts and/or credits, to the corporate account due to the cumulative amount of time delay events incurred by the employees of the company. The corporate account may also be a time based product, such as one month of in-flight network access for all employees of the corporation. In some embodiments, the user may be a different person and/or entity than that described above. In some embodiments, other variations of a timed product for corporations may be possible. In some embodiments, the corporate account may not be a timed product, but rather, a data quantity product (i.e., a fee exchanged for an amount of data transferred over the in-flight network).

For network status 453, and users 455, 457, and 459, shaded plots represent times when the network status 453 is "unavailable" and/or times where the users 455, 557, and 459 are unable to access the "unavailable" network. In the displayed embodiment, a network status 453 of "unavailable" represents a diminished network connectivity available to one or more users aboard the flight. For example, the response speed of the in-flight network to the data request of one or more users is slower than normal. As a result, the systems 10 and/or 11 cannot accommodate some of the data requests from one or more users. In one embodiment, an unavailable network status 453 indicates the systems 10 and/or 11 require additional time to respond to a data request from one or more users, which in turn may indicate diminished network connectivity.

In some embodiments, a network status 453 of "unavailable" may indicate that part of the in-flight network and/or systems 10 or 11 are unable to accommodate data requests by one or more users. For example, a wireless access point 214 may malfunction during the flight. Consequently, devices in communication with that wireless access point may be unable to access the in-flight network. As a result, the network status 453 may be plotted as unavailable, even though other devices not relying on the malfunctioning wireless access. 214 can still enjoy in-flight network access. Thus, in one embodiment, a network status 453 of "unavailable" may prevent one user from accessing the in-flight network, while another user is unaffected and can access the in-flight network.

Alternatively, a user may be unable to access the in-flight network, even though the status 453 shows the network being "available." In this situation, because the network status 453 is "available," this suggests that the issue is with the computing device of the user attempting to access the network, as opposed to the hardware and/or software associated with delivery of the in-flight network. In this case, the user would not be categorized as experiencing a time delay event and/or a network degradation event because the network was available. Thus, no remedial measures are provided by the systems 10 and/or 11 to the user.

For users 455, 457, and 459, the plotted areas, whether shaded or unshaded represent times during the flight where the user attempted to access the in-flight network. For example, user 459 has a plotted area 492 during which the user 459 attempted to access the in-flight network. Additionally, user 457 has three blocks of time, block 482, block 485, and block 488, during which the user 457 attempted to access the in-flight network. While user 459 was successful with his attempt to access the network (492), user 457, on the other hand, was unsuccessful on all of his attempts. In one embodiment, an attempt by a user to access the in-flight network includes one or more data requests sent by the user to the systems 10 and/or 11. In some embodiments, the attempt may include the user trying to register a new account to receive a data delivery service plan providing the user in-flight network access. In some embodiments, an attempt may include more, less, and/or different data requests or actions than those described.

Network Availability Chart: Network Status

In the displayed embodiment of FIG. 4, network status 453 includes sections 494, 460, 462, 464, 466, 468, and 495. Section 494 occurs prior to the flight stage 417, at which point the flight cruises at a height higher than the service above ground level height 414 until making a final descent. Prior to time 416, the in-flight network is unavailable. Thus, during the boarding stage 405, the taxiing stage 411, and the initial ascent stage 413, the in-flight network is unavailable for access by the users 455, 457, and 459. In some embodiments, the systems 10 and 11 intentionally prevent access to the in-flight network prior to point 416. In some embodiments, the in-flight network is intentionally unavailable due to regulations by a government body, such as the FAA.

Once the "cruising" stage 417 begins, in one embodiment, the network status 453 may experience one or more networks status changes during this stage of the flight. In the displayed embodiment of FIG. 4, the network is available during portions of the cruising stage 417 (e.g., 460, 464, and 468) and unavailable during other portions (e.g., 462 and 466) of the cruising stage 417.

For example, in the displayed embodiment, the network is available during block 460, which begins at time 416 and ends at time 461. At time 461, the network status switches to unavailable for block 462 until time 463. At time 463, the network status switches to available for block 464 until time 465. At time 465, the network status switches back to unavailable for block 466 until time 467. At time 467, the network status switches yet again to available for block 468 until time 418. At time 418, which corresponds with the beginning of the landing stage 419, the network is unavailable for block 495. The block of time 495 includes the landing stage 419, the taxiing stage 421, and the deplaning stage 423. The network is unavailable during the plotted time 495 because the height of the flight is no longer expected to be above the service above ground level height line 414 for an extended period of time. In one embodiment, the in-flight network is intentionally made unavailable by systems 10 and/or 11 when the flight is below line 414. Thus, the in-flight network status 453 during block 495 is unavailable. However, in other embodiments, the in-flight network is intentionally unavailable only during stages 413 and 419.

Network Availability Chart: Users

User 455 attempts to access the in-flight network during the entire flight. As a result, the success and failures of the attempts made by user 455 to access the network mirror the network status 453. Thus, user 455 includes blocks of time 470, 472, 474, 476, 478, 480, and 496 which correspond to the network status 453 blocks of time 494, 460, 462, 464, 466, 468, and 495 respectively. For example, the block of time 470 corresponds to the block of time 494, meaning 470 begins and ends at approximately the same time as block 494. Furthermore, both blocks are the result of unavailable network access. Similarly, block 476 corresponds to block 464. As a result, block 476 begins and ends at approximately the same times (463, 465) as block 464. Furthermore, block 476 and block 464 are the result of available network access.

In the displayed embodiment of FIG. 4, user 457 attempts to access the network for blocks 482, 485, and 488. Block 482 begins at time 481, which is after time 461, and ends at time 483, which is before time 463. Thus, user 457 attempts to access the network for a block of time 482 that is within the block of time 462, during which the network status 453 is "unavailable." As a result, user 457 is unable to access the network.

Block 485 begins at time 484, which is after time 465, and ends at time 486, which is before time 467. As a result, the block 485 occurs within block 466, during which time the network status 453 is "unavailable." Consequently, user 457 is unable to access the in-flight network during block 485. Block 488 begins at time 487, which is after time 418, and ends at time 489, which is prior to time 420. Thus, block 488 occurs in its entirety within the landing stage 419. Because the in-flight network is unavailable during the landing stage 419, the user is unable to access the network during block 488.

For blocks 482 and 485, the user may have experienced a network degradation event, and possibly a time delay event because the network was unavailable during the cruising stage 417, a stage during which the in-flight network is typically available. However, block 488 would not be a network degradation event or a time delay event because the block 488 occurs during the landing stage 419, a stage of the flight during which the in-flight network is typically intentionally made unavailable.

User 459 attempts to access the in-flight network for a portion of time 492 which occurs during the cruising stage 417. Block 492 begins at time 491, which is after time 463, and ends at time 493, which is before time 465. As a result, block 492 occurs in its entirety within block 464, during which time the in-flight network is available. Thus, user 459 is able to access the in-flight network during block 492.

In some embodiments, the network status 453 may be available and/or unavailable for more, less, and/or different times than those displayed in FIG. 4. Further, in other embodiments, more, less, and/or different users may be affected than those displayed in FIG. 4. In some embodiments, the users may attempt to access the in-flight network more often, less often, and/or at different times then what is displayed in FIG. 4. In some embodiments, a user may experience different results when attempting to access the in-flight network than those displayed in FIG. 4.

Network Degradation Events

As mentioned earlier, a network degradation event occurs when the in-flight network experiences diminished network connectivity. As a result, when the systems 10 and/or 11 determine the in-flight network is suffering from diminished network connectivity, the systems 10 and/or 11 determine whether the diminished connectivity is a network degradation event. In one embodiment, the systems determine diminished connectivity can be categorized as a network degradation event if the amounts and/or factor by which the network connectivity has diminished is greater than or equal to a predetermined degradation threshold. In some embodiments, the predetermined degradation threshold is a factor and or an amount relating to network connectivity. In one embodiment, the threshold is expressed as a percentage (e.g., 10%). In another embodiment, the threshold is expressed as an amount of data transferred per unit of time (e.g., 100 Megabytes/second).

In some embodiments, the degradation threshold may also include a time component. For example, the diminished network connectivity must be at least a 20% reduction that lasts for at least 10 seconds for the diminished connectivity to be considered a network degradation event. Also, the degradation threshold may be adjustable and/or dynamically determined. In some embodiments, more, less, and/or different criteria than a degradation threshold may be used to determine whether or not a network degradation event has occurred.

For example, in FIG. 4, the systems 10 and/or 11 may determine whether or not blocks 462 and 466 are network degradation events. This is because the network status 453 was "unavailable" during blocks 462 and 466, which are blocks of time when the network status 453 is typically "available." Thus, the systems 10 and/or 11 would then determine whether blocks 462 and/or 466 should be considered network degradation events by comparing the data from each block to a predetermined degradation threshold. In one embodiment, the predetermined degradation threshold may require at least a 10% reduction of network connectivity lasting for at least 10 seconds for diminished connectivity to be categorized as a network degradation event. If either block 462 and/or 466 meets that criteria, the blocks would be considered a network degradation event.

In one embodiment, if the in-flight network is unable to accommodate any data requests (i.e., a diminished connectivity of 100%) that lasts for only five seconds, the blocks 462 would not be considered a network degradation event. Alternatively, the block 466 represents a diminished network connectivity of 50% that lasts for 20 minutes, then the block 466 would be considered a network degradation event. Blocks 494 and 495 would not be considered network degradation events because the in-flight network is typically unavailable during the stages of flight before and after the cruising stage 417. In some embodiments, the threshold may be constant throughout an entire stage and/or an entire flight. In other embodiments, the degradation threshold may vary during different stages of the flight, and/or different times of a stage of the flight.

However, in some embodiments, the in-flight network may be available during the boarding and deplaning stages 409 and 423, respectively. Further, the in-flight network may also be available during the taxiing stages 411 and 421. Thus, in some cases, the in-flight network is only restricted from being available during stages 413 and 419. In these cases, it may be possible for diminished connectivity during stages 409, 411, 421, and/or 423 to be considered a network degradation event based on a degradation threshold comparison.

Network Unavailable Notification Page

FIG. 5 is a diagram of a screenshot of an in-flight network unavailable notification page 500. In one embodiment, page 500 is displayed on a customer computing device 204 when the device 204 attempts to access the in-flight network at a time when the in-flight network is unavailable (e.g., during flight stages 413, 419, during a network degradation event, etc.). The screenshot 500 includes a username 502, an airline 504, and a flight number 506.

In some embodiments, the page 500 may include more, less, and/or different data than the displayed embodiment of FIG. 5. For example, page 500 may not include a username 502. This would allow the page to be generated for any user accessing the in-flight network on a selected flight for a selected airline (e.g., any passenger on XYZ Airlines, Flight 555 in FIG. 5). In another embodiment, page 500 is a generic page that does not include a name 502, airline 504, or flight number 506.

The page 500 may be provided to the device 204 in various ways. In one embodiment, the page is stored at the node 206, such that when the device 204 can access the node 206, but cannot access the system 10 due to an issue with an access network 62a-c, the node 206 generates the page 500 for display at the device 204. In another embodiment, page 500 is stored at a switch within the vehicle communication system 11 and sent to the device 204 in response to a data request from the device 204 that cannot be accommodated after a predetermined amount of time.

Alternatively, the page may be stored at the device 204 and displayed on the device 204 in response to a data request that has not been accommodated by the in-flight network for a predetermined amount of time. For example, if the delayed response exceeds a predetermined unavailable network threshold, the page 500 may be retrieved from the device memory to be displayed at the device 204. The predetermined unavailable network threshold may be one minute, although other values are possible. In some embodiments, page 500 is stored at the device 204 when the device 204 is granted a data delivery service plan for in-flight network access. In some embodiments, page 500 is stored in the cache memory of the device 204. In some embodiments, page 500 may be stored and/or delivered to the device 204 differently than the methods described above.

Time Delay Events

The systems 10 and/or 11 may also determine whether one or more users experienced a time delay event during a network degradation event. In some embodiments, a time delay event may be determined if the user attempted to access the in-flight network during a network degradation event, and thus was unable to access the in-flight network. Further, the network degradation event may be required to exceed a time delay event threshold for the network degradation event to be categorized a time delay event. For example, the time delay event threshold may be a unit of time, such as seconds, minutes, and/or days. While the time delay event threshold may be fixed throughout a stage of the flight and/or the entire flight, in some embodiments, the time delay event varies throughout the entire flight and/or at various times during a stage of a flight.

For example, in the displayed embodiment of FIG. 4, the time delay event threshold may be 15 minutes and the network degradation event 466 may last 20 minutes. In this case, the network degradation event 466 may be considered a time delay event for both users 455 and 457. Additionally, the network degradation event 466 may not be considered a time delay event for user 459. Users 455 and 457 suffered a time delay event because the network degradation event duration exceeded the time delay event threshold (20 minutes is greater than 15 minutes). Additionally, the users 455 and 457 attempted to access the in-flight network during block 466 (e.g., blocks 478 and 485) and were unable to access the in-flight network. Because users 455 and 457 are negatively affected by the unavailable in-flight network, and because the time delay event threshold is exceeded by the network degradation event duration, the users 455 and 457 are deemed to have incurred a time delay event.

User 459, on the other hand, is determined to have not experienced a time delay event because the user 459 did not attempt to access the in-flight network during a network degradation event. As a result, the user 459 was unaffected by the network degradation event. However, in some embodiments, a user may be deemed to have incurred a time delay event regardless of whether the user was affected by the network degradation event.

While the displayed embodiment determines whether a network degradation event is a time delay event based on the user attempting to access the network during the network degradation event and the time delay event threshold being exceeded, in other embodiments, more, less, and/or different factors are considered when determining whether or not a network degradation event should be categorized as a time delay event. For example, in some embodiments, whether or not a user attempted to access the network during a network degradation event is ignored. In other words, if a network degradation event occurs that exceeds the time delay event threshold, the system deems all applicable users on the flight to have suffered a time delay event, regardless of attempted access. Thus, in an embodiment where a user attempt is not required for a time delay event, user 459 would be considered to have suffered a time delay event due to the network degradation event 466 having a duration (20 minutes) longer than the time delay event threshold (15 minutes).

When a network degradation event is categorized as a time delay event for all "applicable users" because it exceeds a time delay event threshold, "applicable users" refers to users on the flight during the time delay event. In some embodiments, "applicable users" only includes users that have registered at one point in time for in-flight network service. In some embodiments, "applicable users" only includes users that are currently registered for in-flight network access. In some embodiments, "applicable users" only includes currently registered users with time remaining on their data delivery service plan for in-flight network access that could be used on that flight. In some embodiments, other criteria may apply for "applicable users" to be considered as having suffered a time delay event.

In other embodiments, other factors may also be considered when determining whether or not a user suffered a time delay event. These factors may include network degradation event frequency, time delay event frequency, in-flight network access history, business metrics, membership status, and/or other factors.

In some embodiments, time delay events may be granted different levels of severity. For example, a user unable to access the network for an entire flight may be deemed to have suffered a more severe time delay event than a user unable to access the in-flight network for 20 minutes. The severity of the time delay event suffered by the user may be considered when determining possible remedial measures in response to the suffered time delay event(s). For example, a user experiencing a more severe time delay event may receive a better remedial measure (e.g. larger time credits, larger discounts, longer extended services, larger data credits, more movie and/or song credits, more activities credits, etc.) than a user experiencing a less severe time delay.

Thus, in FIG. 4, user 455 may receive a better remedial measure than user 457 because his time delay event 478 lasted longer than the time delay event 485 of user 457. In some embodiments, other factors may be considered when assessing the severity of a time delay event. Furthermore, in other embodiments, factors other than the severity of a time delay event may affect the remedial measures provided to a user. For example, other factors that may be considered include network degradation event frequency, time delay event frequency, in-flight network access history, account history, business needs, membership status, and/or other factors.

Remedial Measures

For time based products, the systems 10 and 11 provide remedies to customers in response to time delay events by providing additional time, credits, services, and/or discounts to the customer's account. In one embodiment, the customer receives a time extension (additional time) for their account equal to the delay time. The delay time approximates the amount of in-flight network access time the customer lost due to an unavailable network. Depending on the factors used to determine whether a network degradation event is a time delay event, the delay time may equal the duration of a network degradation event, the duration of a time delay event, or some other amount of time.

In some embodiments, a network degradation event is categorized as a time delay event for applicable users on a flight, regardless of whether or not the user attempted to access the in-flight network. In this embodiment, the delay time equals the duration of the network degradation event. However, in other embodiments, the delay time may be longer or shorter than the duration of the network degradation event.

In other embodiments, a network degradation event is categorized as a time delay event for users only if they unsuccessfully attempted to access the in-flight network during the network degradation event. In this case, the delay time may be equal to the duration of the time delay event. Alternatively, the delay time may be equal to the lesser value of the duration of the network degradation event versus the duration of the time delay event. In yet another alternative, the delay time may remain equal to the duration of the network degradation event. In other embodiments, the delay time is equal to a different value.

While additional time may be used as a remedial measure for some timed products, for other timed products, additional time may not be the preferred remedial measure. For example, if the customer has a monthly in-flight network access data delivery service plan that automatically renews each month, additional time may not be a beneficial remedial measure for this customer. Instead, remedial measures including monetary credits, discounts, and/or other services may be more beneficial to this customer. Specifically, monetary remedial measures including credits for previous purchases, credits for future purchases, and/or discounts for future purchases may provide a better, more valuable remedial measure for this customer.

The monetary remedial measure amount may be determined based on several factors. In one embodiment, the amount of a monetary remedial measure may be equal to the proportion of the delay time to the subscribed initial time (one month). For example, if the user during his one month (30 days) in-flight network access plan suffers time delay events on three different days, the user may receive a monetary remedial measure (i.e., a credit or a discount) equal to 10% (i.e., 3 days divided by 30 days) of the one month in-flight network access fee.

Alternatively, each time delay event incurred may have a predetermined monetary remedial measure amount. For example, a time delay event incurred for each day may automatically entitle a customer to either a five dollar credit or a 10% discount on their next in-flight network access purchase. Alternatively, other criteria may be used to determine the amount of a monetary remedial measure based on a time delay event experienced by the customer.

The monetary remedial measure may be redeemed for services already purchased. For example, the customer may receive a five dollar credit back on a month of in-flight network access service that was already purchased (i.e., the current month). Alternatively, the monetary remedial measure may be provided for a future month, such as a five dollar credit or a 10% discount for in-flight network access for next month. In yet another alternative, the monetary remedial measure may be provided to the customer for redemption by the customer on a service of their choice at a time of their choice (this month, next month, six months from now, etc.).

Additionally, remedial measures involving different services may be possible. For example, credits and/or discounts for purchases of data, songs, movies, television shows, satellite television, and/or other entertainment content during the flight may be possible. Additionally, credits and/or discounts for purchases of services, such as gaming, messaging, phone calls, video conferencing, and are other services, may also be possible.

When the systems 10 and 11 determine the amount of a remedial measure, typically the systems are determining amounts to compensate the customer for the amount of time or services lost due to the time delay event. In one embodiment, the amount of the remedial measure is approximately equal to the loss of time and/or services corresponding to the delay time. However, in other embodiments, the amount of the remedial measure may be based on a value larger or smaller than the delay time due to other factors.

The amount of the remedial measure may be based on a value larger than the delay time due to several factors. These include business needs (e.g., improving customer satisfaction, building a brand, revenue generation, etc.), subscription status of the customer (e.g., a premium account), severity of time delay events, quantity of time delay events, account history, denominations of remedial measures, and/or other factors. In one example of denominations, if the available additional time remedial measures are for denominations of three hours, 24 hours, or one month, and the time delay event incurred by a customer has a delay time of five hours, the customer may receive a remedial measure of 24 hours of additional in-flight network access time, as opposed to only 3 hours. An additional 24 hours ensures the customer is compensated fully for all 5 hours of delay time experienced by the customer, whereas 3 additional hours would shortchange the customer. Alternatively, the customer may receive two coupons for three hours each of in-flight network access (six hours total) to fully compensate for the five hour time delay event.

The remedial measure amounts may be smaller than the value of the delay time for several reasons. For example, if the customer suffers a time delay event with delay time of four hours, but the customer only had one hour of in-flight network access remaining on his plan, then the customer will receive a remedial measure based on a value of one hour because the customer only lost one hour of in-flight network access time. Other factors that may contribute to smaller remedial measure amounts include the lack of severity of a time delay event, a low quantity of time delay events, account history, delinquency of payment of accounts by the customer, business needs, and/or other factors.

In some embodiments, the user receives a choice of the remedial measure he receives. For example, in response to a time delay event suffered by the customer, the system may provide the customer with the choice of a free three-hour timed product, a discounted 24 hour timed product, or a discount code for 10% off on any purchase. Further, the remedial measure could be a combination of remedial measure types. For example, a customer suffering a five hour time delay event during a 24 continuous hour timed product may receive a remedial measure of a free (credit) 24 continuous hours of in-flight network access and 10% off the customer's next purchase. In this case, the credited 24 continuous hour in-flight network access timed product would compensate the user for time lost during his original timed product due to the time delay event. Meanwhile, the 10% discount would encourage the customer to remain a customer, despite service issues. However, other combinations of remedial measures are possible.

Account Modification Customer Notification (Credits)

Figure 6:
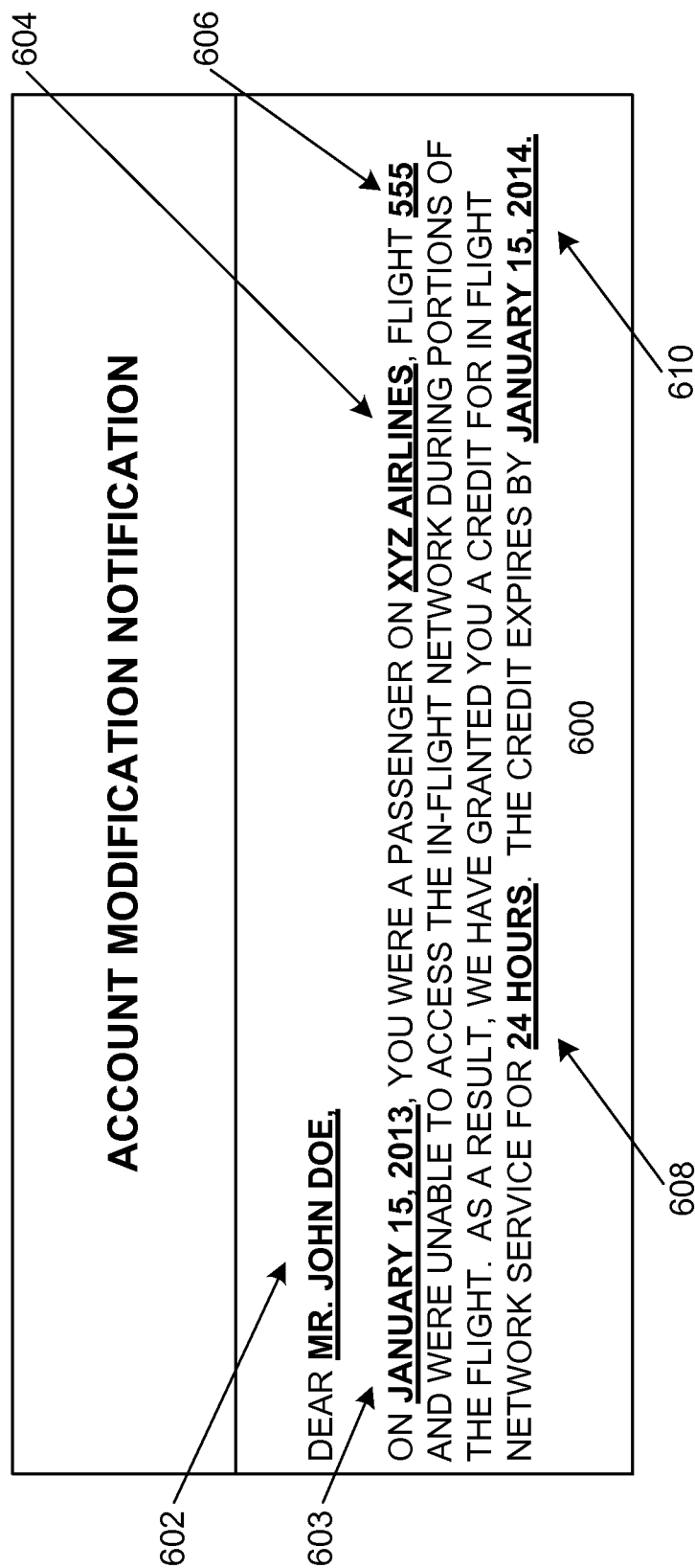
FIG. 6 is an example screenshot of a message from a ground based vehicle communication system informing a subscriber about subscription plan modifications for the subscriber due to a network degradation event that affected the subscriber's plan, according to an embodiment.

FIG. 6 is an example diagram of an account modification customer notification 600. The notification 600 may be a text message, email, letter, phone call, conversation, account notification digital message, or some other communication to notify a customer that their account has been modified. The notification 600 may be sent because the data delivery service plan of a customer has been modified due to a time delay event suffered by the customer on a recent flight. For example, a customer may receive a notification 600 informing the customer that an additional day of in-flight network access has been added to the data delivery service plan of the customer due to a time delay event the customer experienced on a recent flight. However, in some embodiments, the notification 600 may be sent to the customer for other reasons . . . .

In the displayed embodiment of FIG. 6, the notification 600 includes a customer name 602, a date 603, an airline 604, a flight number 606, a time extension 608, and an expiration time 610. In some embodiments, the notification 600 may include more, less, and/or different information. For example, the notification may include additional information regarding the data delivery service plan of the customer, such as the amount of in-flight network access time initially subscribed for by the customer, the amount of in-flight network access time remaining for the customer, any specific airlines required for in-flight network access for the customer, or other account information for the customer. Alternatively, the notification may include less information. For example, the notification may not include items such as the date 603, airline 604, the flight number 606, and/or other information.

In the displayed embodiment, customer name 602 is determined from the account information stored for that customer. The account information may also include the date 603, airline 604, and flight 606 upon which the time delay event occurred for the customer. The account information for the customer may also store a time extension 608 of in-flight network access to provide the customer due to the time delay event the customer suffered. The account information may also include an expiration time 610 for the time extension 608. However, in other embodiments, the time extension 608 does not have an expiration time 610.

In FIG. 6, the system 10 determines to grant the customer a credit because the customer (John Doe) suffered a time delay event on XYZ airlines, flight 555 on Jan. 15, 2013. A credit can be redeemed by a customer for a service offered by the systems 10 or 11. The credit can be redeemed for use by the customer whenever the customer chooses to do so, so long as it is prior to an expiration time 610. In FIG. 6, the customer receives a credit 608 for one day of in-flight network service access with an expiration time 610 of Jan. 15, 2014.

Alternatively, the credit granted to the customer by the system 10 could be larger than one day (e.g., two days, one week, and/or one month) or smaller than one day (e.g., 12 hours, 3 hours, 1 hour, 15 minutes, etc.). The credit granted by the system 10 to the customer could be for any amount of time deemed appropriate due to the time delay event suffered by the customer. In one embodiment, the credit is any amount of time between one minute and one year.

In FIG. 6, the credit offered by the system to the customer would be redeemed on a different date from the date 603 (Jan. 15, 2013) and thus, a different flight from the XYZ airlines, flight 555 that occurred on Jan. 15, 2013. However, in some embodiments, the credit may be redeemed on the same day 603, but on a different flight, as that of the time delay event. Furthermore, the credit may even be redeemed during the same flight as that of the time delay event (i.e., during the same flight as the time delay event occurring on Jan. 15, 2013, XYZ airlines, flight 555).

In some cases, the credit may be restricted for redemption by only the customer. In some embodiments, the credit could be redeemed by the customer for use by someone else (e.g., customer's spouse or family member). In some situations, the credited service may be restricted for use on devices registered with the customer's account receiving the credit. In other situations, the customer receiving the credit may be allowed to redeem the credit on any device. More, less, and/or different redemption policies may be possible with respect to credits. The aforementioned redemption policies may also apply for other remedial measures, including monetary credits, discounts, data credits, etc.

FIG. 6 also displays expiration time 610 as "Jan. 15, 2014". This expiration time corresponds to an expiration period of one year from the occurrence of the time delay event. However, expiration time 610 may be different depending on the value of the expiration period. For example, if the expiration period for FIG. 6 equaled six hours from the occurrence of the time delay event, the expiration time 610 may be Jan. 15, 2013 or Jan. 16, 2013, depending on what time the time delay event occurred. Alternatively, if the expiration period of FIG. 6 equaled one week from the date the time delay event began, the expiration time 610 would be Jan. 22, 2013. The expiration period can be any amount of time equal to or longer than the time credit granted (e.g., four or more hours for a four hour time credit, two or more hours for a two hour movie credit, etc.). Alternatively, a credit may not have an expiration time, in which case the expiration period would be infinite, and/or nonexistent.

In FIG. 6, the credit is made available to the customer by automatically modifying the customer's account. Once the account is modified, the customer can use the credit during any applicable flight prior to the expiration time 610. However, in some embodiments, the credit may be granted via a redeemable code provided to the customer for entry when the credit is being used. For example, for a monetary credit for 10% off a customer's next in-flight network access data delivery service plan purchase, the customer may enter the redeemable code for the 10% off monetary credit and receive a plan with the 10% credited discount due to the redeemed discount code. Other types of credits may be used via a redeemable code. One benefit of credits is that the customer can use and/or redeem the credit whenever the customer wants to prior to the expiration time 610.

Extended Services

Although FIG. 6 displays credits as one type of remedy, an alternative remedy type for a time delay event could be an extended service during the flight upon which the time delay event occurred. Unlike a credit, an extended service is not redeemable by the customer at the choice of the customer. Rather, the extended services offered by the systems 10 and/or 11 are available during a specified time for use by the customer. For example, the system 10 may provide the customer an extended service of one additional day of in-flight network service access to the data delivery service plan of the customer. Therefore, if the customer has a data delivery service plan that provides a flight network access through the end of the month, the extended service (one additional day) would result in a plan that provides the customer in-flight network access through the first day of the following month. The customer could not apply that extended service of one day to a day different from the first day of the following month.

Each extended service includes a duration, service type, and possibly applicable flights, and applicable airlines. The duration of an extended service defines the length of additional time the extended service will be provided by the systems 10 and/or 11 to the customer. A duration could last for any applicable time. A duration could be as short as one second, and as long as multiple years. Thus, a duration of an extended service may be for one or more minutes, one or more hours, one or more days, one or more weeks, one or more months, and/or one or more years. Alternatively, the duration may be for the remainder of a flight. Another alternative duration may equal the remainder of the day. Yet another alternative duration may equal the remainder of a travel itinerary of a customer (e.g., two weeks).

The service type of an extended service defines the types of service the customer receives for the duration of the extended service. Examples of service types include in-flight network access time, data quantity, data access (e.g., entertainment content, media, movies, television, songs, applications, software files, video files, audio files, and/or other data), activities (email, messaging, text messaging, phone calls, gaming, and/or other activities) and/or a combination of one or more of the aforementioned service types. For example, customers on a flight experiencing a lengthy time delay event may receive an extended service for the remainder of the flight (duration) permitting the customers to access movies and/or the in-flight network (service type defined by a combination of two service types, movies and in-flight network access).

The extended service may also be defined by applicable flights and/or airlines. For example, a customer may receive an extended service with a duration of the remainder of the day and a service type of in-flight network access. However, the customer may be restricted to using the extended service for only one additional flight. Alternatively, the customer may be restricted to using the extended service only on flights for XYZ airlines. While extended service has been defined by a duration, service type, applicable flights, and applicable airlines, the extended service may have more, less, and/or different criteria used to define the extended service.

While FIG. 6 has been described as providing a notification in connection with the remedy (i.e. credits and/or extended services), a notification may be provided without a remedy. For example, a notification may be provided to the customer 602 describing the time delay event by providing the date 603, the airline 604, and the flight number 606 of the time delay event without providing any remedy information (i.e., time extension 608, expiration time 610) because the systems 10 and/or 11 have determined not to provide a remedy for the time delay event. Additionally, the systems 10 and/or 11 may provide more, less, and/or different remedies than the credits and extended services described in connection with FIG. 6.

Interrupted Activity Time Extension

Customers may get frustrated with timed products for in-flight network access due to degraded network performance resulting from the plane flying through an area of poor coverage. As discussed, remedial measures relying on timed extensions may help mitigate customer frustration and enhance customer satisfaction. Another application of time extensions for timed products involves preventing customers engaged in an activity from being interrupted by discontinued service due to the purchased in-flight network access initial time running out. By automatically granting a time extension at the end of the initial time, a customer can complete their activity prior to network access being discontinued, thus improving customer satisfaction and eliminating potential customer frustration.

In one embodiment, first, the system 11 may determine if the user is engaged in an activity at the time, or slightly before, the user's initial time for network access runs out. If the user is not engaged in an activity when the initial time expires, the system can discontinue in-flight network access. Otherwise, the system may grant an automatic time extension to the user.

To determine the user's activity prior to the initial time expiring, in one embodiment, the system 11 prompts the user for a response to determine the user's current activity. In another embodiment, the system 11 analyzes recently stored information regarding the user to predict whether or not the users involved currently in an activity. In other embodiments, the system 11 may rely on other methods to determine whether or not the user is engaged in an activity. In other embodiments, the system 10 or both systems 10 and 11 determine if the user is engaged in an activity when the initial time runs out, or just before it runs out.

Next, if the system 11 determines the user is engaged in an activity, the system 11 may automatically extend the initial time granted to the user by a time extension, in one embodiment. In this case, the system 11 may send a prompt notifying the user that the initial time has been extended by the time extension. Additionally, the system 11 may notify the user that the in-flight network access will expire once the time extension lapses without the user adding more time. Once the time extension lapses, if the user hasn't added more in-flight network access time, the system 11 discontinues in-flight network access, regardless of the activity of the user.

Alternatively, when the initial time expires, if the user is still engaged in an activity, the system 11 may prompt the user to determine if the user wants a time extension. If the user elects not to extend the time, then the system discontinues in-flight network access to the user immediately. Alternatively, if the user chooses to extend the initial time by the time extension, the system may provide the user the additional time extension for in-flight network access. Once the time extension expires, the system may discontinue in-flight network access to the user.

The timed product initial time may be 3 hours, 24 hours, or one month, in some embodiments. Alternatively, the initial time may be a different amount of time that is appropriate for a timed product from one minute to multiple years. The timed product initial time may be continuous or non-continuous, as discussed earlier with timed products. The time extension may be any amount of time appropriate for time extensions from one second up to one year. In one embodiment, the time extension is five minutes. In another embodiment, the time extension is for the remainder of the flight.

In some embodiments, system 10, or systems 10 and 11 together provide the user time extensions and/or prompt the user about the time extensions. In some embodiments, more, less, different, and/or a different order of steps may be taken to automatically provide time extensions to users to prevent user activity from being interrupted.

Ground-Based Vehicle Communication System Methods

Figure 7:
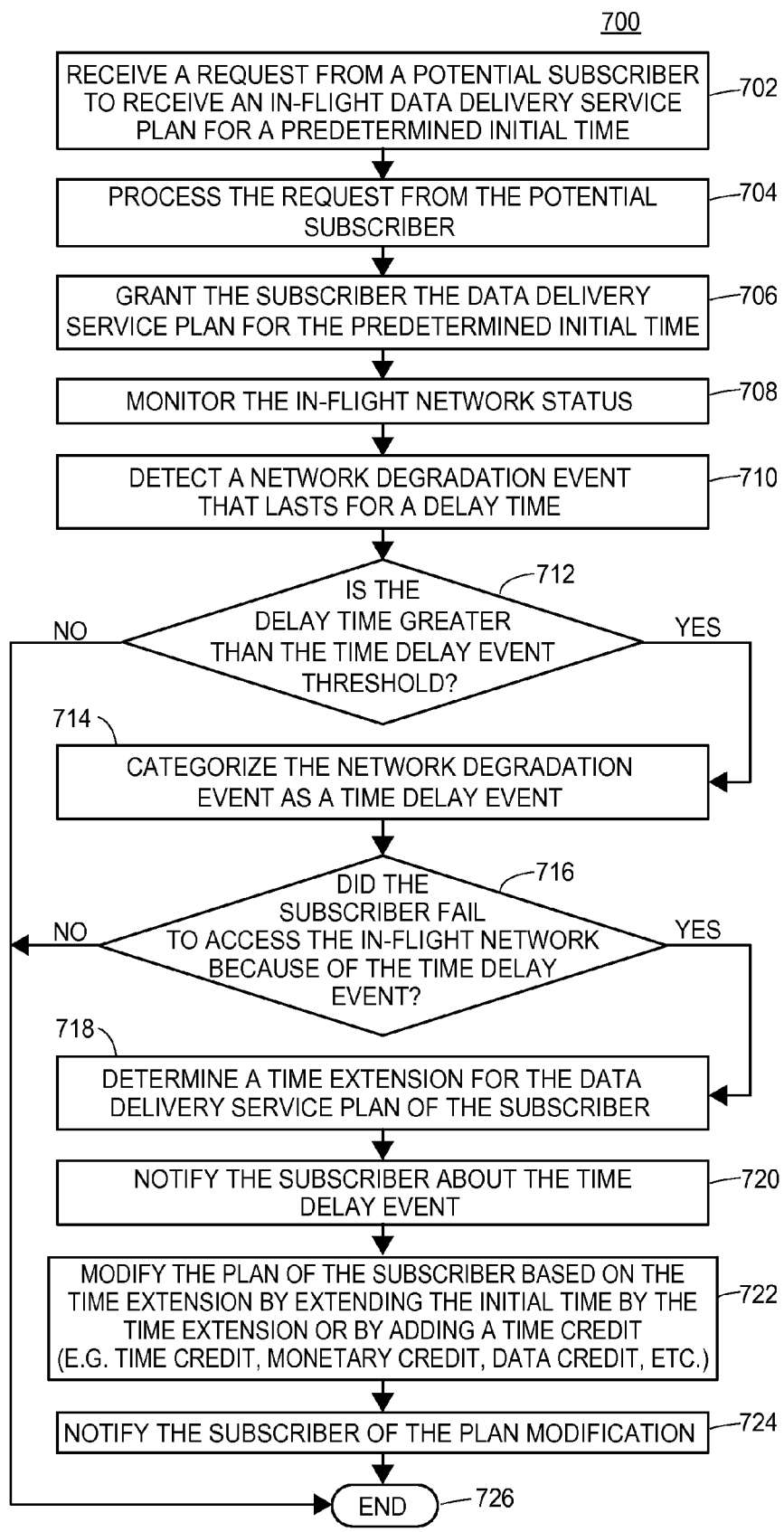
FIG. 7 is a flow diagram of a ground-based communication system providing a subscriber a time extension or credit to the subscriber's plan due to a network degradation event categorized as a time delay event, according to an embodiment.

FIG. 7 is a diagram of an example method 700 for a ground-based communication system to provide in-flight network access to a subscriber based on a data delivery service plan. First, the system receives a request from a potential subscriber to receive an in-flight data delivery service plan for a predetermined initial time (block 702). Next, the system processes the request from the potential subscriber (block 704). After that, the system grants the subscriber the data delivery service plan for the predetermined initial time (block 706). The system also monitors the in-flight network status (block 708). While monitoring the network, the system then detects a network degradation event that lasts for a delay time (block 710).

At block 712, the system answers the question of whether the delay time is greater than the time delay event threshold. If the answer is "no," then the method 700 ends (block 726). Otherwise, the method 700 proceeds to categorize the network degradation event as a time delay event (block 714). After the event is categorized, the system then determines whether the subscriber failed to access the in-flight network because of the time delay event (block 716). If the answer is "no," then the method 700 ends (block 726). Otherwise, the system proceeds to determine a time extension for the data delivery service plan of the subscriber (block 718). In some embodiments, the method 700 does not include block 716, and thus the method proceeds directly from block 714 to 718.

The system then notifies the subscriber about the time delay event (block 720). After that, the system proceeds to modify the plan of the subscriber based on the time extension by either extending the initial time by the time extension or by adding a time credit (block 722). The credit may be a time credit, monetary credit, and/or data credit. Following this step, the system then notifies the subscriber of the plan modification (block 724). After notification, the method 700 ends (block 726). In some embodiments, the initial time may be 24 continuous hours or one month. In some embodiments, the time extension may be an additional 24 continuous hours.

While the displayed embodiment of method 700 includes the steps shown in FIG. 7, in other embodiments, the method may include more, less, and/or different steps than those displayed. For example, the method 700 may also include steps where the ground-based communication system communicates information to and/or receives information from the vehicle communication system, such as subscriber information, subscriber plan modification information, network degradation event information, etc. Further, in some embodiments, the displayed steps may be arranged in a different order than the order shown in FIG. 7.

Figure 8:
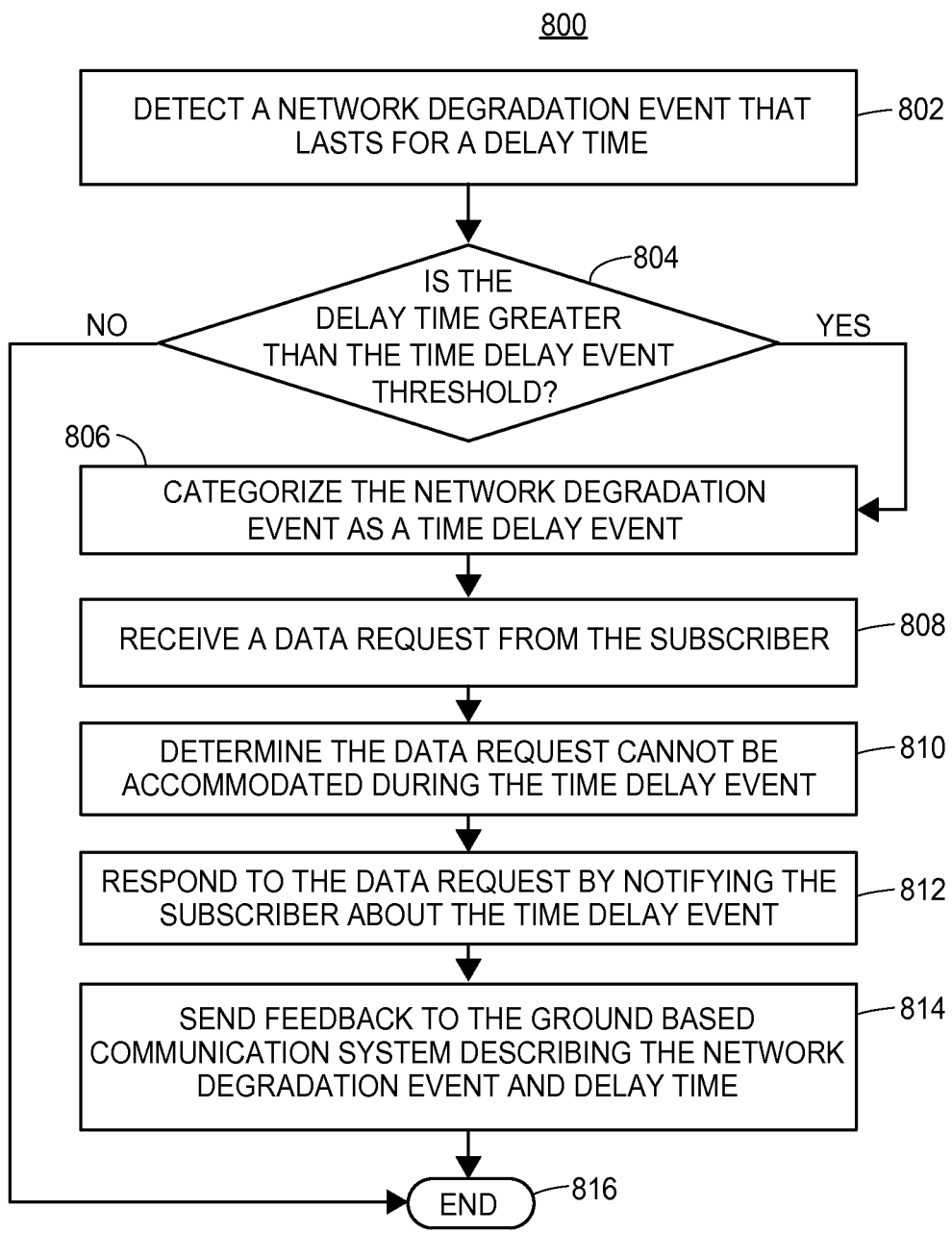
FIG. 8 is a flow diagram of a vehicle communication system providing a subscriber a time extension or credit to the subscriber's plan due to a network degradation event categorized as a time delay event, according to an embodiment.

FIG. 8 is a diagram of an example method 800 for a vehicle communication system to provide in-flight network access to a subscriber based on a data delivery service plan. First, the system detects a network degradation event that lasts for a delay time (block 802). Next, the system determines whether the delay time is larger than a time delay event threshold (block 804). If the answer is "no," the method 800 ends (block 816). Otherwise, the system categorizes the network degradation event as a time delay event (block 806).

Next, the system receives a data request from the subscriber (block 808). The system then determines that the data request cannot be accommodated during the time delay event (block 810). Following this step, the system responds to the data request by notifying the subscriber about the time delay event (block 812). The system also sends feedback to the ground based communication system describing the network degradation event and delay time (block 814). Finally, the method 800 ends (block 816). Similar to FIG. 7, in some embodiments, the method 800 contains fewer, more, and/or different steps than those displayed. Also, the method 800 may execute steps in a different order than the order shown in FIG. 8.

Figure 9:
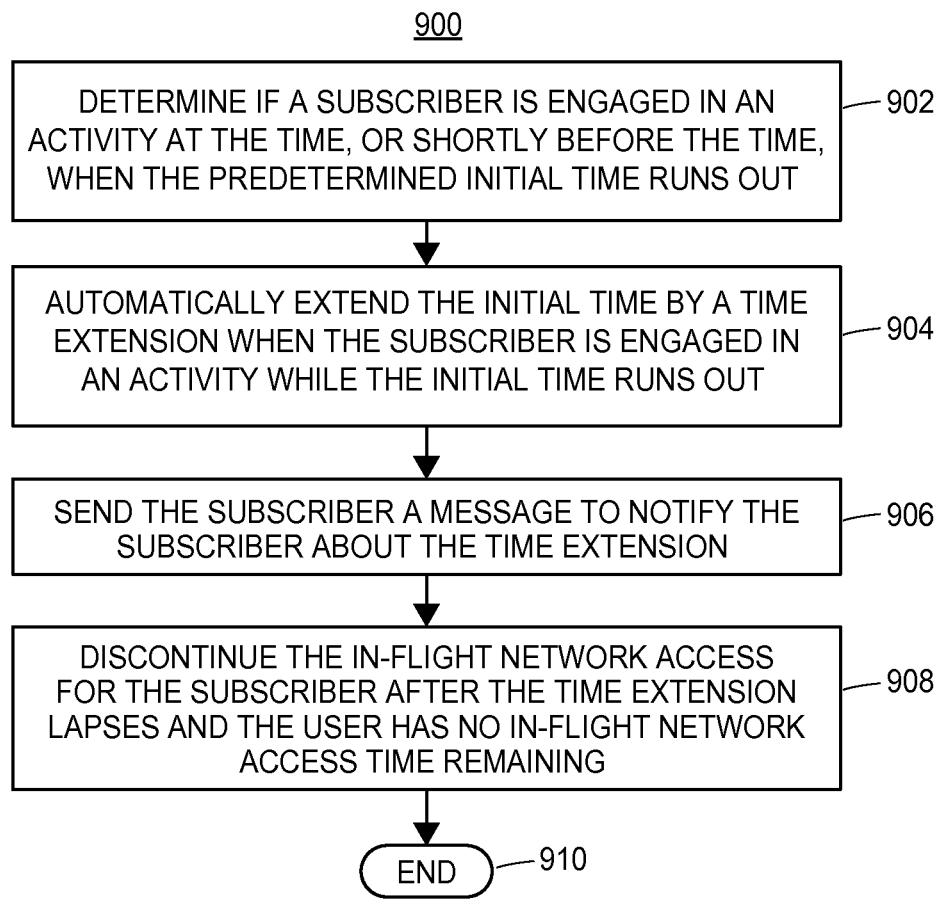
FIG. 9 is a flow diagram of a system providing a subscriber a time extension to allow the subscriber to complete an activity before discontinuing in-flight network access, according to an embodiment.

FIG. 9 is a diagram of an example method 900 for a system, such as systems 10 or 11 or both, to provide in-flight network access to a subscriber based on a data delivery service plan. First, the system determines if a subscriber is engaged in an activity at the time, or shortly before the time, when the predetermined initial time runs out (block 902). Next, the system automatically extends the initial time by a time extension when the subscriber is engaged in an activity while the initial time runs out (block 904). After that, the system sends the subscriber a message to notify the subscriber about the time extension (block 906).

The system then discontinues the in-flight network access for the subscriber after the time extension lapses and the user has no in-flight network access time remaining (block 908). Finally, the method 900 ends (block 910). Similar to FIGS. 7 and 8, in some embodiments, the method 900 contains fewer, more, and/or different steps than those displayed. Also, the method 900 may execute steps in a different order than the order shown in FIG. 9.

CONCLUSION

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

The invention claimed is:

1. A computer system for providing a dynamic, time-based data delivery service to airline passenger subscribers while in flight, comprising:
   a ground based communication system including:
      a ground based communication system processor; and
      a ground based communication system program memory stored with executable instructions that when executed by the ground based communication system processor cause the computer system to:
         receive a request from a potential subscriber to receive an in-flight data delivery service plan to access data via an in-flight network for a predetermined initial time;
         verify the request from the potential subscriber;
         grant the subscriber the in-flight data delivery service plan to access data via the in-flight network for the predetermined initial time;
         detect a network degradation event that lasts for a delay time, wherein the network degradation event occurs during a flight when the in-flight network has a decreased network connectivity and/or response speed that exceeds a degradation threshold;
         categorize the network degradation event as a time delay event;
         determine, in response to the time delay event, a modification for the in-flight data delivery service plan for the subscriber to access data via the in-flight network;
         notify the subscriber about the network degradation event;
         modify the in-flight data delivery service plan for the subscriber to include the modification; and
         notify the subscriber of the modification to the in-flight data delivery service plan.

2. The system of claim 1 further comprising:
a vehicle communication system, wherein the vehicle communication system communicates with the ground based communication system, the vehicle communication system including:
a vehicle communication system processor; and
a vehicle communication system program memory storing executable instructions that when executed by the vehicle communication system processor further cause the computer system to:
receive a network access request from the subscriber to access data via the in-flight network during the flight;
verify the subscriber is authorized to access data via the in-flight network during the flight;
grant the network access request of the authorized subscriber to access data via the in-flight network during the flight;
receive a data request from the authorized subscriber during the time delay event;
determine the data request cannot be accommodated during the time delay event; and
respond to the data request by providing the subscriber a network degradation event notification during the time delay event.

3. The system of claim 2, wherein the instructions stored on the vehicle communication system program memory cause the vehicle communication system processor to send feedback to the ground based communication system describing the network degradation event, and wherein the instructions stored on the ground based communication system program memory further cause the ground based communication system processor to receive the feedback.

4. The system of claim 3, wherein the ground based communication system communicates to the vehicle communication system via an air-to-ground (ATG) communication link, wherein the ATG link is an ATG frequency band allocated for delivering data to and from the vehicle communication system while in flight.

5. The system of claim 2, wherein the instructions stored on the ground based communication system program memory further cause the ground based communication system processor to monitor the in-flight network of the flight to detect decreased network connectivity and/or response speed.

6. The system of claim 1, wherein the predetermined initial time is either one hour, one day, one week, or one month.

7. The system of claim 6, wherein the modification is either a monetary credit for a future data delivery service plan purchase by the subscriber or an extension of the predetermined initial time.

8. A method for providing a dynamic, time-based data delivery service to airplane passenger subscribers while in flight comprising:
receiving, by one or more computing devices, a request from a potential subscriber to receive an in-flight data delivery service plan to access data via an in-flight network for a predetermined initial time;
verifying, by the one or more computing devices, the request from the potential subscriber;
granting, by the one or more computing devices, the subscriber the in-flight data delivery service plan to access data via the in-flight network for the predetermined initial time;
detecting, by the one or more computing devices, a network degradation event that lasts for a delay time, wherein the network degradation event occurs during a flight when the in-flight network has a decreased network connectivity and/or response speed that exceeds a degradation threshold;
categorizing, by the one or more computing devices, the network degradation event as a time delay event;
determining, by the one or more computing devices, in response to the time delay event, a time extension for the in-flight data delivery service plan for the subscriber to access data via the in-flight network, wherein the time extension is determined based on at least the delay time or the predetermined initial time;
notifying the subscriber about the network degradation event;
modifying, by the one or more computing devices, the in-flight data delivery service plan for the subscriber based on the time extension; and
notifying, by the one or more computing devices, the subscriber of the modification to the in-flight data delivery service plan.

9. The method of claim 8, wherein categorizing the network degradation event as a time delay event further comprises:
determining the delay time exceeds a time delay event threshold; and
determining the subscriber tried to access the in-flight network during the time delay event and experienced decreased network connectivity and/or response speed during the time delay event.

10. The method of claim 8, wherein the predetermined initial time is either one hour, 24 continuous hours, one day, one week, or one month.

11. The method of claim 8, wherein the in-flight data delivery service plan for the subscriber is modified by providing the subscriber access to the in-flight network for the time extension in addition to the pre-determined initial time during the same flight.

12. The method of claim 8, wherein the time delay event occurs during a first flight, wherein the in-flight data delivery service plan for the subscriber is modified by providing the subscriber a time credit to their plan, wherein the time credit equals the time extension, wherein the time credit provides the subscriber access to an in-flight network for a second flight, wherein the time credit has an expiration date.

13. The method of claim 8, wherein the subscriber is notified of the modification to the subscriber's in-flight data delivery service plan by any one of the following: email, text message, account notification digital message, letter, voicemail, or phone call.

14. The method of claim 8, wherein at least a portion of the network degradation event occurs during the flight after takeoff and before landing, wherein the flight can be determined to be after takeoff and before landing when the flight continuously exceeds a predetermined height above ground level.

15. The method of claim 8, wherein the in-flight data delivery service plan restricts in-flight network access by the subscriber to one airline during the pre-determined initial time.

16. The method of claim 8, wherein notifying the subscriber of the time delay event further comprises:
receiving, by the computer devices, a data request from the subscriber during the time delay event;
determining, by the computer devices, the data request cannot be accommodated during the time delay event; and
responding to the data request by providing the subscriber a network degradation event notification during the time delay event.

17. The method of claim 16, wherein the network degradation event notification is a webpage indicating access to the in-flight network is temporarily unavailable.

\* \* \* \* \*